United States Patent
Modavi et al.

(10) Patent No.: US 9,617,839 B2
(45) Date of Patent: Apr. 11, 2017

(54) METHOD OF FORMING DIRECTIONALLY CONTROLLED WORMHOLES IN A SUBTERRANEAN FORMATION

(71) Applicants: Abdollah Modavi, Kensington, CA (US); Richard E. Beckham, Pearland, TX (US)

(72) Inventors: Abdollah Modavi, Kensington, CA (US); Richard E. Beckham, Pearland, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 0 days.

(21) Appl. No.: 14/693,428

(22) Filed: Apr. 22, 2015

(65) Prior Publication Data
US 2015/0345267 A1 Dec. 3, 2015

Related U.S. Application Data

(60) Provisional application No. 62/003,601, filed on May 28, 2014.

(51) Int. Cl.
*E21B 43/16* (2006.01)
*G06T 17/05* (2011.01)
(Continued)

(52) U.S. Cl.
CPC ............ *E21B 43/16* (2013.01); *E21B 43/28* (2013.01); *E21B 43/30* (2013.01); *E21B 47/00* (2013.01); *E21B 47/06* (2013.01); *G06T 17/05* (2013.01)

(58) Field of Classification Search
None
See application file for complete search history.

(56) References Cited

U.S. PATENT DOCUMENTS

| 2,689,009 A | 9/1954 | Brainerd et al. |
| 3,768,564 A | 10/1973 | Knox et al. |
| (Continued) | | |

FOREIGN PATENT DOCUMENTS

| IN | 1133/MUM/2010 | 4/2013 |
| WO | WO 2009/148723 | 12/2009 |
| (Continued) | | |

OTHER PUBLICATIONS

Bazin, B., (2001) "From Matrix Acidizing to Acid Fracturing: A Laboratory Evaluation of Acid/Rock Interactions," *SPE No. 665,666, SPE Production & Facilities*, Feb. 2001.
(Continued)

*Primary Examiner* — Angela M DiTrani
*Assistant Examiner* — Anuradha Ahuja
(74) *Attorney, Agent, or Firm* — ExxonMobil Upstream Research Company—Law Department

(57) ABSTRACT

A method for forming extended wormholes in a subsurface formation comprising locating producer wells, injection wells, and guard wells in a field; determining a flux rate for a formation-dissolving fluid such as an acid, the flux rate being dependent upon different variables including the composition of the rock matrix making up the subsurface formation and the type of acid selected; injecting a guard fluid into the subsurface formation, through at least one guard well to form designed pressure boundaries and injecting the acid into the formation at a rate to reach the determined flux rate and thereby forming an extended network of wormholes through the subsurface formation in a defined direction or plane, with or without guard wells.

37 Claims, 15 Drawing Sheets

(51) Int. Cl.
*E21B 47/00* (2012.01)
*E21B 47/06* (2012.01)
*E21B 43/28* (2006.01)
*E21B 43/30* (2006.01)

(56) References Cited

U.S. PATENT DOCUMENTS

| | | | |
|---|---|---|---|
| 3,842,911 | A | 10/1974 | Knox et al. |
| 3,934,651 | A | 1/1976 | Nierode et al. |
| 4,233,165 | A | 11/1980 | Salathiel et al. |
| 4,245,702 | A | 1/1981 | Haafkens et al. |
| 4,359,391 | A | 11/1982 | Salathiel et al. |
| 4,634,187 | A | 1/1987 | Huff et al. |
| 4,724,905 | A | 2/1988 | Uhri |
| 4,830,106 | A | 5/1989 | Uhri |
| 5,111,881 | A | 5/1992 | Soliman et al. |
| 5,207,778 | A * | 5/1993 | Jennings, Jr. ............ C09K 8/74 166/281 |
| 7,303,012 | B2 | 12/2007 | Chan et al. |
| 7,561,998 | B2 * | 7/2009 | Panga .................... E21B 43/16 166/281 |
| 8,815,785 | B2 * | 8/2014 | Welton .................. C09K 8/506 166/295 |
| 2003/0225521 | A1 * | 12/2003 | Panga .................... E21B 43/25 702/6 |
| 2008/0015831 | A1 * | 1/2008 | Tardy ..................... E21B 43/25 703/10 |
| 2008/0015832 | A1 | 1/2008 | Tardy |
| 2009/0095482 | A1 | 4/2009 | Surjaatmadja |
| 2009/0194273 | A1 | 8/2009 | Surjaatmadja et al. |
| 2011/0067871 | A1 | 3/2011 | Burdette et al. |
| 2011/0220359 | A1 * | 9/2011 | Soliman .................. C09K 8/88 166/305.1 |
| 2012/0202720 | A1 | 8/2012 | De Wolf et al. |
| 2013/0096890 | A1 | 4/2013 | Vanderheyden et al. |
| 2013/0220604 | A1 | 8/2013 | El-Rabaa et al. |

FOREIGN PATENT DOCUMENTS

| | | |
|---|---|---|
| WO | WO 2010/087898 | 8/2010 |
| WO | WO 2013/089897 | 6/2013 |

OTHER PUBLICATIONS

Economides, M. J., et al., (2000) ed., *Reservoir Stimulation*, 3rd Ed., Wiley, New York, ISBN 0471491926.

McDuff, D. R., et al., (2010) "Understanding Wormholes in Carbonates: Unprecedented Experimental Scale and 3-D Visualization", *SPE 134379*.

Siddiqui, M. A., et al., (2013) "Enhance of Oil Production from an Old Well in Thin Carbonate Reservoir through Acid Tunneling—A Case Study", *SPE 164876*.

\* cited by examiner

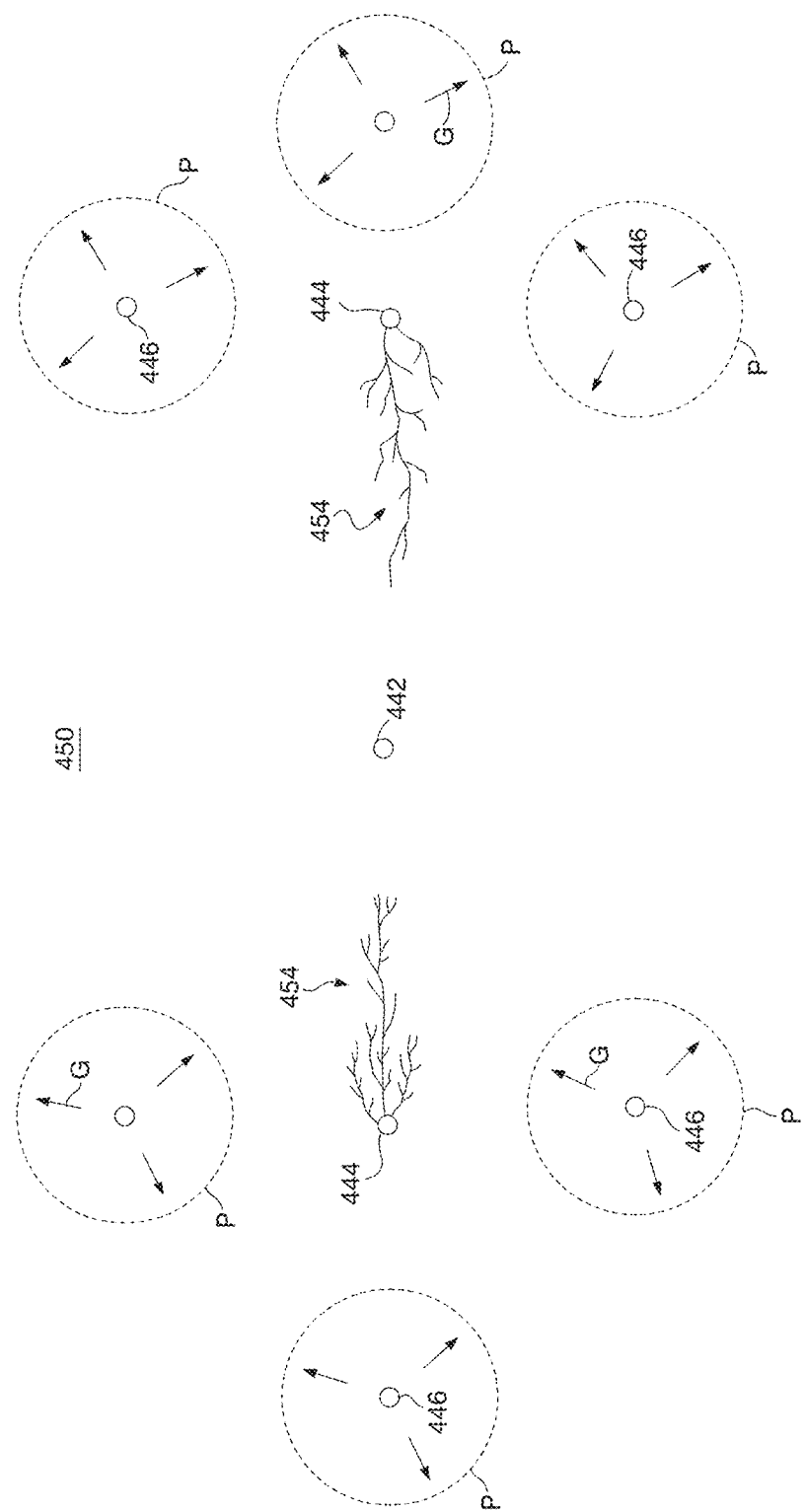

METHOD OF FORMING DIRECTIONALLY CONTROLLED WORMHOLES IN A SUBTERRANEAN FORMATION

CROSS-REFERENCE TO RELATED APPLICATIONS

This application claims the benefit of U.S. Ser. No. 62/003,601, filed May 28, 2014, entitled METHOD OF FORMING DIRECTIONALLY CONTROLLED WORMHOLES IN A SUBTERRANEAN FORMATION, the entirety of which is incorporated by reference herein.

BACKGROUND OF THE INVENTION

This section is intended to introduce various aspects of the art, which may be associated with selected embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of hydrocarbon recovery operations. More specifically, the present invention relates to the formation of wormholes along a desired azimuth in a subsurface formation using a formation-dissolving fluid in order to provide flow paths for hydrocarbon fluids.

DISCUSSION OF TECHNOLOGY

In the drilling of oil and gas wells, a wellbore is formed using a drill bit that is urged downwardly at a lower end of a drill string. After drilling to a predetermined depth, the drill string and bit are removed and the wellbore is lined with a string of casing. An annular area is thus formed between the string of casing and the surrounding formations.

As part of the completion process, a string of production casing is placed along production zones at a lower end of the wellbore. The production casing is then perforated by shooting lateral holes through the casing and the surrounding cement column at desired intervals. The perforations create fluid communication between the wellbore and the surrounding formation. This, in turn, allows hydrocarbon fluids to flow into the wellbore.

In some instances, the wellbore is completed without the use of production casing. This is referred to as an open hole completion. Open hole completions typically employ sand screens having a slotted internal base pipe.

In either instance, packers may be placed along the production zones to provide selective isolation of areas of production. Such packers may be inflatable packers, mechanically-set packers, or so-called swell packers.

Many wellbores are now being completed in tight formations, that is, formations having a very low permeability. These formations, also known as unconventional reservoirs, may have a permeability of less than 500 milli-Darcies ("md"), or less than 50 md, or even less than 10 md. In such instances, a fracturing operation may be conducted. Hydraulic fracturing consists of injecting viscous fluids (usually shear thinning, non-Newtonian gels or emulsions) into a formation at such high pressures and rates that the reservoir rock will "part" and form a network of fractures. The fracturing fluid is typically mixed with a proppant material such as sand, ceramic beads, or other granular materials. The proppant serves to hold the fractures open after the hydraulic pressures are released. In the case of so-called "tight" or unconventional formations, the combination of fractures and injected proppant substantially increases the flow capacity of the treated reservoir.

After an oil or gas well has been completed, its communication with the target hydrocarbon-bearing formation can be substantially improved through a process known as stimulation. Stimulating a well is often economical if the formation near the wellbore (within a few feet) has been damaged by well construction or completion, or if the hydrocarbon-bearing formation has a very low permeability. Well stimulation is typically accomplished through chemical means, although such is sometimes combined with mechanical means.

The most common chemical means of stimulating a well is referred to as matrix dissolution. To accomplish matrix dissolution, a chemical capable of dissolving the rock matrix forming the hydrocarbon-bearing formation is injected through the well. The chemical acts to remove some of the rock material at the wellbore face and to clean out and enlarge the formation pores in the near-wellbore region. The most common chemicals used are acids. Is such cases, the process is more descriptively referred to as matrix acidization or acid stimulation.

The selection of the acid to be used in a matrix stimulation job depends on the lithology of the target formation. Sandstone reservoirs are typically treated with a mixture of hydrochloric and hydrofluoric acids known as "mud acid." This acid mixture will attack tiny clay particles left behind by the drilling mud that may be clogging the formation pores, as well as silicates and feldspars making up the rock of the formation. In known practices, mud acid injected into a sandstone reservoir does not penetrate more than a foot from the surface of the wellbore. This depth of penetration is frequently sufficient to remove the filter cake of clay particles left behind by the drilling mud on the surface of the wellbore, as well as any clay particles in the near-wellbore region that migrated from the drilling mud and filter cake into the reservoir's pores. In this way, the productivity of the well may be improved.

Carbonate reservoirs, such as those containing limestone or dolomite, are most frequently stimulated with hydrochloric acid. In this case, the depth of penetration depends on the velocity of the acid in the carbonate formation's pores, the volume and concentration of acid injected, the diffusivity of the acid, the lithology of the formation (specifically, the fraction of limestone vs. dolomite), the porosity of the formation, and the reaction temperature. Of these factors, the pore velocity of the acid is often the most variable during a stimulation job.

After injection into the target formation, if the acid's pore velocity is too slow, the acid will diffuse to and attack the pore walls before it is able to significantly penetrate into the formation. At such low velocities, the practical result is so-called "face dissolution" of the wellbore. In this instance, a majority of the acid is consumed while enlarging the wellbore rather than penetrating beyond the near-wellbore region. On the other hand, if the acid is injected too quickly, it will be carried through the pores and away from the wellbore before a substantial quantity has a chance to diffuse to and attack the pore walls. This condition is known as "uniform dissolution."

A third mechanism for dissolution is referred to as "wormhole dissolution." This occurs during pore velocities between face dissolution and uniform dissolution. Wormhole dissolution, or wormholing, creates channels that penetrate from the wellbore, through the damaged near-wellbore region, and into the hydrocarbon-bearing formation while consuming the minimum amount of acid.

Wormholing represents the most economical use of acid when matrix acidizing a carbonate reservoir. During the wormholing process, the pore velocity of the acid balances diffusion of the acid to the pore walls with convection of the acid deeper into the formation. The result is that the acid first enlarges the pores to initiate the wormholes, and then etches the tip of the wormhole deeper into the formation.

As currently practiced, matrix acidizing is limited to the near-wellbore region, i.e., generally within a few feet and, in rare instances, up to about ten feet. While this length is long enough to penetrate a typical well's damage zone, it is not sufficient to alter the target formation's properties on a reservoir scale. Thus, the stimulation technique is frequently referred to simply as "skin removal."

The practical length of wormholes is currently limited by two considerations: the first is diffusivity of the acid, and the second is radial flow away from the well.

Concerning diffusivity, in order for a wormhole to continue growing, sufficient acid must reach the wormhole tip. However, diffusion of the acid to the wormhole wall where it reacts with the surrounding rock matrix will deplete the available acid as the carrier fluid travels further down the growing wormhole. After a certain length, no more acid will reach the wormhole tip because practically all of it will have already diffused to and reacted with the wormhole wall. As a result, if a wormhole is to grow well beyond the near-wellbore region, the diffusivity of the acid must be reduced.

Perhaps the most effective method of reducing an acid's diffusivity is to emulsify it. Emulsification of acid for deeper penetration is an established technology. Various emulsifiers have been disclosed by Exxon Production Research Co. (a predecessor to ExxonMobil Upstream Research Company) and by Exxon Research and Engineering Co. in U.S. Pat. No. 3,934,651, U.S. Pat. No. 4,233,165 and U.S. Pat. No. 4,359,391. However, these patents rely upon the concept of radial flow, that is, injecting the acid into the wellbore in order to sweep the near-wellbore region radially.

As previously explained, wormholes will form only if a sufficient acid pore velocity is maintained. Should the velocity be reduced too much from the optimum value for wormhole formation, the wormhole growth will stop and the acid will be consumed by face dissolution. Acid injected into a formation from a well typically flows away from the wellbore radially, with the front of the injected fluid assuming a larger and larger cylinder as it moves away from the wellbore. The impact of this spreading of the injected fluid due to radial flow is a rapid drop in pore velocity as the fluid further invades the formation. Even if the acid is traveling at velocities sufficient for wormhole formation as it exits the well, and even with utilizing additives (such as diverters and emulsifiers), the reduction in velocity due to radial flow will limit the practical depth of wormhole formation to the near-wellbore region.

As an option for extending the acid reach beyond the near-wellbore region, the Exxon patents cited above also generally teach injecting the emulsified acid into the wellbore under pressures greater than the formation parting pressure. This adds a mechanical aspect to simulating a well which involves fracturing the formation with a combination of hydrostatic and dynamic pressure. The nature of fracturing used depends upon the lithology. If the formation is shale, the simulation job focuses on opening existing fractures in the formation, and is typically accomplished with a low viscosity fluid. New fractures are frequently formed in sandstone and carbonate reservoirs with a high viscosity fluid. In both cases, the fracturing fluid is typically mixed with a proppant material such as sand, ceramic beads, or other granular materials. The proppant serves to hold the fractures open after the hydraulic pressures are released. It is observed that acid fracturing is not typically practiced on shales.

A major limitation for mechanical stimulation relates to controlling the direction in which fractures tend to propagate. In this respect, the fractures do not always propagate from the wellbore in a direction that is optimal for well productivity or injection. The orientation of fractures in an underground formation is generally controlled by the in situ stresses of the formation. It is known that subsurface formations are subjected to three principal stresses. These represent a vertical stress and two orthogonal horizontal stresses. When a formation is hydraulically fractured, the created fractures should propagate along a path of least resistance. Under principals of geomechanics, the path of least resistance should be in a direction that is perpendicular to the direction of least principal stress.

In deeper formations (generally, formations deeper than about 1,000 to 2,000 feet), one of the horizontal stresses is usually the smallest stress. Consequently, fractures tend to propagate perpendicular to the direction of least principal stress, the fractures together forming an approximately vertically oriented planar fracture. In other words, if the horizontal directions are the x and y axes and the vertical direction is defined by a z axis, and the direction of least principal stress is in the x direction, fractures would form in the y-z plane.

Attempts have been made in the past to modify the direction in which fractures propagate. For example, in U.S. Pat. No. 5,111,881, entitled "Method to Control Fracture Orientation in Underground Formation," it was proposed to first determine the anticipated fracture orientation of a hydrocarbon-bearing formation. The wellbore was then perforated in the anticipated direction of the fracture, and fluid was injected into the wellbore to form a first fracture. A substance was then injected into the first fracture which would temporarily harden. The formation was then perforated in a direction perpendicular to the original anticipated fracture orientation of the hydrocarbon bearing formation, and re-fractured to form a second fracture. It was believed that the second fracture would propagate in a direction away from that of the first fracture. The result was that independent fractures in two horizontal directions would be formed.

U.S. Patent Publ. No. 2009/0095482 and U.S. Patent Publ. No. 2009/0194273 describe a method for orchestrating multiple subsurface fractures at multiple well locations in a region. This is done by flowing a well treatment fluid from a centralized well treatment fluid center. In operation, a fracture is formed at a first well location, and the effects of that fracture on stress fields within the formation are measured. Sensors disposed about the region are adapted to output effects on the stress fields. This process is then repeated for subsequent fractures.

ExxonMobil Upstream Research Company recently filed U.S. Patent Publ. No. 2013/0220604 entitled "Methods For Establishing A Subsurface Fracture Network." That application teaches methods for creating a subsurface fracture network. In one aspect, the method generally comprises designing a desired fracture network system using geomechanical simulation. In the method, the in situ stresses needed to create the desired fracture network within a reservoir are determined. A layout of wells is then configured to alter the in situ stresses within the stress field. The method also includes injecting a fracturing fluid under pressure into the reservoir in order to create an initial set of fractures, monitoring the in situ stresses within the stress field, and then updating the geomechanical simulation based on the monitored in situ stresses. From there, the method includes designing a program of modifying the in situ stress within the stress field using geomechanical simulation, modifying the in situ stresses within the stress field by implementing at least one aspect of the program, and injecting a fracturing fluid under pressure into the reservoir in order to expand upon the initial set of fractures and to create the desired fracture network.

Additional patents discussing the orientation of fractures include U.S. Pat. No. 4,830,106 and U.S. Pat. No. 4,724,905, each of which is entitled "Simultaneous Hydraulic Fracturing." The foregoing patent references represent attempts to control the direction of propagating formation openings using a high-pressure injection of fracturing fluid through a producing wellbore.

U.S. Pat. No. 7,303,012 describes a technique wherein a viscous, polymeric fracturing fluid is injected through a wellbore and into a formation. The fracturing fluid carries a proppant. After fractures are formed, and while the fractures are still held open with pressure, a formation-dissolving viscous carrier is injected. The new formation-dissolving fluid partially dissolves the subsurface rock along the fracture faces. Pressure is then relieved from the wellbore and the fractures are allowed to close.

The '012 patent mentions generally the phenomenon of wormholing. As described earlier, wormholing occurs when appropriate acids are injected into carbonate reservoirs. However, the combination of acid and mechanical stimulations does not fundamentally alter the wormhole process, nor the expected maximum length of the wormholes. Only the location of wormhole initiation is altered—in this case, the fracture face rather than the original wellbore surface.

The '012 patent also addresses the idea of using a viscous acidic fluid itself to part the rock through injection under pressure. This idea has been proposed in other patents as well. U.S. Pat. No. 2,689,009 mentions the injection, at fracturing pressure, of a viscous emulsion of an acid and an oily fluid, wherein the emulsion carries a propping agent. This is followed by the injection of a plain acid for breaking the emulsion and reacting with the formation. Halliburton's U.S. Pat. Nos. 3,768,564 and 3,842,911, each of which is entitled "Method of Fracture Acidizing a Well," describe the formation of a fracture without using a propping agent. The fracture is opened by using an acid after the fracture has been closed. U.S. Pat. No. 4,245,702, issued to Shell and entitled "Method for Forming Channels of High Fluid Conductivity in Hard Acid-Soluble Formations," also discusses the idea of etching channels along previously-formed fracture walls. See also B. Babin, "*From Matrix Acidizing to Acid Fracturing: A Laboratory Evaluation of Acid/Rock Interactions*," SPE No. 665,666 (February 2001).

The chemical and mechanical stimulation techniques discussed above can improve the economics of a well, especially if the wellbore face has been compromised by the construction or completion work. However, a need remains for a matrix dissolution process wherein the pressure field beyond the near wellbore region is altered, thereby allowing the etching of long wormholes, such as wormholes that are significantly greater than ten feet, at lower injection pressures. Further, a need exists for a chemical dissolution method that controls the direction of channels as they grow within a subterranean formation in response to the injection of a formation-dissolving fluid. Further, a need exists for a method of forming a network of extended wormholes by either identifying a pressure boundary, or by creating a pressure boundary within a formation that urges the flow of a formation-dissolving fluid along a defined plane.

SUMMARY OF THE INVENTION

A method for forming extended wormholes in a controlled direction in a subsurface formation is provided.

In one aspect, the method first includes determining a lithology of a rock matrix in the subsurface formation. The method also includes determining a pressure regime in the subsurface formation.

The method next includes completing a first wellbore in the subsurface formation. In one aspect, the well is completed in a substantially horizontal orientation. Thereafter, the method comprises injecting a formation-dissolving fluid into the subsurface formation through the first wellbore. The injection takes place at a flux rate designed to create wormholes through the rock matrix.

The method also includes continuing to inject the formation-dissolving fluid at the desired flux rate so as to form wormholes that extend beyond ten feet from the first wellbore, and substantially along a plane defined between the wellbore and an area of lower formation pressure within the subsurface formation. Thus, the operator has identified a direction in which the wormholes will preferentially extend. Preferably, the wormholes extend a length that is greater than 50 feet, or greater than 100 feet.

In one aspect, the method also includes discontinuing the injection of the formation-dissolving fluid into the subsurface formation after a first period of time, and then producing hydrocarbon fluids from the first wellbore for a second period of time. This reversing of wellbore operations may be duplicated again and again, in cycles.

It is understood that this method does not preclude the step of adjusting or "engineering" the pressure gradient within the subsurface formation. Thus, in one aspect the method further comprises completing a second wellbore in the subsurface formation adjacent to the first wellbore, and injecting a guard fluid into the subsurface formation through the second wellbore before or during the first time period. This serves to create an area of higher formation pressure on a first side of the first wellbore. A third wellbore may optionally be completed proximate to the first wellbore but opposite from the second wellbore also for the injection of guard fluids. This artificially creates another pressure boundary, driving the wormholes laterally between the pressure boundaries.

It is also understood that this method does not preclude the completion of separate producer wells. Thus, in one aspect the method further comprises completing a fourth wellbore in the subsurface formation adjacent to the first wellbore, and producing hydrocarbon fluids from the fourth wellbore after the first period of time. Ideally, the fourth wellbore is placed near a line that intersects the direction of wormhole growth from the first wellbore, that is, between the pressure boundaries. The production step creates a pressure sink that forms a favorable pressure gradient for wormhole formation.

In one aspect, cycling between production and injection comprises discontinuing injection from the first wellbore and discontinuing production from the fourth wellbore in the first cycle, and then commencing production from the first wellbore and injection through the fourth wellbore in a second cycle. This cycling may be reversed and repeated for additional cycles.

Another method for forming extended wormholes in a subsurface formation is also provided herein. In one aspect, the alternative method first comprises locating at least one guard well in the field. The guard well is completed in the subsurface formation.

The method also includes injecting a guard fluid into the subsurface formation. The guard fluid is injected through the at least one guard well. This serves to form an artificial pressure boundary within the subsurface formation. The pressure boundary may be formed by using guard wells that are placed on opposing sides of the injection well. Alternatively, the pressure boundary may be formed by placing the guard well on a side of the injection well that is opposite a very low-permeability layer, or impermeable layer, that creates a seal. Alternatively, the pressure boundary may be formed by placing the guard well on a side of the injection well that is opposite to an area of high reservoir pressure.

The method also includes locating a first injection well in the field. The first injection well is also completed in the subsurface formation.

The method also includes determining a flux rate for a formation-dissolving fluid. The flux rate is dependent upon different variables including the composition of the rock matrix making up the subsurface formation and the type of acid or other formation-dissolving fluid selected. In one illustrative embodiment, the formation comprises primarily a carbonate rock matrix and the formation-dissolving fluid is an acid. An example of an acid is a hydrochloric acid emulsion. In another illustrative embodiment, the formation comprises primarily a sandstone rock matrix and the formation-dissolving fluid is a hydrofluoric acid or a hydrofluoric acid precursor, which may be combined or mixed with hydrochloric acid. In either aspect, the flux rate is preferably determined by using empirical equations tied to a lithology of the rock matrix established through laboratory experiments on core samples.

The method further includes injecting the formation-dissolving fluid into the subsurface formation. The formation-dissolving fluid is injected through the first injection well at a rate to reach the desired flux rate for the acid. At the same time, the formation-dissolving fluid is injected at a pressure that is below a formation parting pressure in the subsurface formation.

Using the formation-dissolving fluid, the method also comprises forming wormholes through the subsurface formation. The wormholes are formed along a plane from the injection well that does not intersect the pressure boundary. In one aspect, the wormholes are formed substantially in a direction between the injection well and a producer well. The wormhole formation process is guided in situ by the pressure gradient as formed, at least in part, by the injection of the guard fluid into the subsurface formation, or the production of fluids out of the subsurface formation.

The pressure gradient induces generally linear flow of acid from the injection well along a planar region, thereby inducing linear flow and significantly exceeding the limited maximum wormhole length observed under traditional radial flow conditions. Preferably, wormholes are generated that extend at least 11 feet, and more preferably at least 30 feet, and still more preferably in excess of 100 feet.

In one embodiment, the method also includes locating a producer well in a field. It is understood that more than one producer well may actually be completed in the subsurface formation. The producer well is located proximate the first injection well. The method then includes producing hydrocarbon fluids from the producer well for a first period of time.

In this embodiment, the guard well creates an area of higher pressure within the subsurface formation while the producer well creates an area of lower pressure within the subsurface formation. This induces wormhole formation in a substantially linear direction along the plane and towards the producer well.

In one aspect, the production well, the first injection well and the guard well are each completed horizontally, with the production wells and the injection wells being completed in the same general azimuth. Alternatively, the production well, the first injection well and the guard well are each completed substantially vertically.

The method may further include conducting a reservoir simulation. The step of simulating the reservoir may include (i) determining a temperature of the subsurface formation, (ii) determining a permeability of the subsurface formation, (iii) determining a porosity of the subsurface formation, (iv) determining in situ pressures within the subsurface formation, or (v) combinations thereof. In one aspect, a result of the step of simulating the reservoir is confirming a direction of the propagation of wormholes substantially toward the producer well. In another aspect, a result of the step of simulating the reservoir is confirming a length of a wormhole network in the direction of the producer well.

In one embodiment, production operations and the injection of the formation-dissolving fluid are suspended after the first period of time. Production is then commenced from the injection well for a second period of time. During this second period of time, acid or other formation-dissolving fluid may be injected into the producer well. In any of the above embodiments, the method may also include monitoring the production of hydrocarbon fluids from the producer well. The operator may optionally continue to inject the guard fluid through the at least one guard well while producing hydrocarbon fluids from the first injection well.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 4A is a cross-sectional view of a subsurface formation having been intersected with various wellbores, including a producer well and a pair of opposing injection wells having wormholes. Various guard wells are also provided, forming pressure boundaries

DETAILED DESCRIPTION OF CERTAIN EMBODIMENTS

Definitions

Figure 1B:
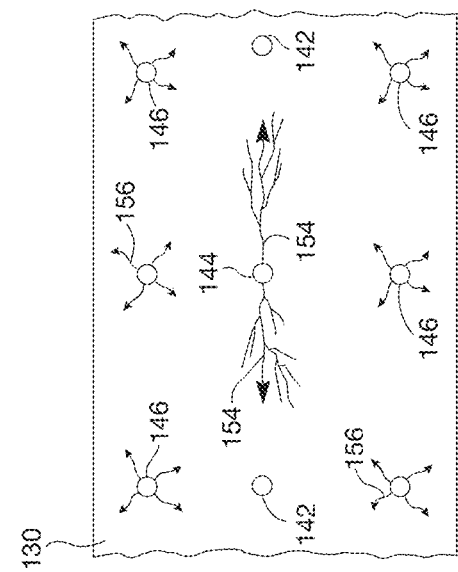
FIG. 1B is a cross-sectional view of the subsurface formation from FIG. 1A, taken across line 1B-1B of FIG. 1A.

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring hydrocarbons, including cyclic terpenes. Examples of hydrocarbon-containing materials include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (15° C.-20° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, pyrolyzed shale oil, synthesis gas, a pyrolysis product of coal, carbon dioxide, hydrogen sulfide and water (including steam). Produced fluids may include both hydrocarbon fluids and non-hydrocarbon fluids.

As used herein, the term "fluid" refers to gases, liquids, and combinations of gases and liquids, as well as to combinations of gases and solids, and combinations of liquids and solids.

As used herein, the term "oil" refers to a hydrocarbon fluid containing a mixture of condensable hydrocarbons.

As used herein, the term "subsurface" refers to geologic strata occurring below the earth's surface.

The terms "subsurface interval" and "subterranean formation" refer to a formation or a portion of a formation wherein formation fluids reside. The fluids may be, for example, hydrocarbon liquids, hydrocarbon gases, aqueous fluids, or combinations thereof.

As used herein, the term "wellbore" refers to a hole in the subsurface made by drilling or insertion of a conduit into the subsurface. A wellbore may have a substantially circular cross section, or other cross-sectional shape. As used herein, the term "well", when referring to an opening in the formation, may be used interchangeably with the term "wellbore."

Description of Specific Embodiments

The inventions are described herein in connection with certain specific embodiments. However, to the extent that the following detailed description is specific to a particular embodiment or a particular use, such is intended to be illustrative only and is not to be construed as limiting the scope of the inventions.

Certain aspects of the inventions are also described in connection with various figures. In certain of the figures, the top of the drawing page is intended to be toward the surface, and the bottom of the drawing page toward the well bottom. While wells commonly are completed in substantially vertical orientation, it is understood that wells may also be inclined and or even horizontally completed. When the descriptive terms "up and down" or "upper" and "lower" or similar terms are used in reference to a drawing or in the claims, they are intended to indicate relative location on the drawing page or with respect to well descriptions, and not necessarily orientation in the ground, as the present inventions at least in some embodiments have utility no matter how the wellbore is oriented.

Various methods for forming extended wormholes in a controlled direction in a subsurface formation are provided herein. The methods rely upon an analysis of the lithology of the rock matrix in the subsurface formation, and a determination of the optimum flux rate for the injection of a fluid-dissolving fluid for wormhole formation in the rock matrix. In some aspects, the methods also rely upon a determination of the pressure field within the subsurface formation. In some aspects, the methods further employ the manipulation of that pressure field to impose an artificial pressure gradient for driving wormholes along a designated direction or plane. The pressure field is manipulated through the introduction of strategically placed pressure sources, or guard wells and, optionally, the use of production wells as pressure sinks. This control of the injected fluids' flow path allows for both the stimulation of the formation beyond the near-wellbore region, and the stimulation of targeted zones of the formation regardless of permeability variation.

Figure 1A:
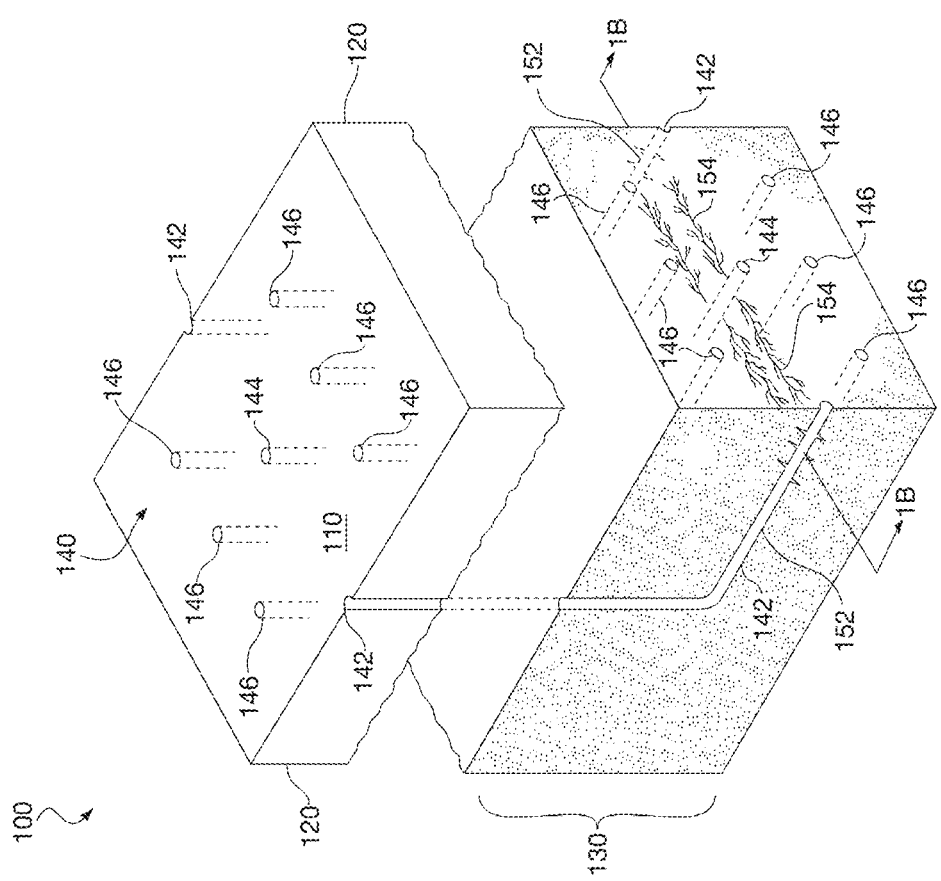
FIG. 1A is a perspective view of a hydrocarbon-producing field. Various wells have been drilled into a subsurface formation, including producer wells and an injection well. Guard wells have been completed on either side of the injection well to form pressure boundaries.

FIG. 1A is a perspective view of a hydrocarbon-producing field 100. The field 100 is shown with a surface 110 and an overburden 120. The surface 110 is depicted as a land surface; however, it is understood that the surface 110 may also be an ocean bottom or the bottom of another body of water, such as a bay or an estuary.

Below the overburden 120, perhaps many thousands of feet down, is a subsurface formation 130. The subsurface formation 130 is comprised of a rock matrix having a low permeability. For example, the rock matrix may have a permeability less than 500 milli-Darcies ("md"), or less than 100 md, or more preferably less than 5 md. The rock matrix may be comprised substantially of a carbonate rock such as dolomite or limestone. Alternatively, the rock matrix may be comprised substantially of sandstone.

In the field 100, various wells are completed in the subsurface formation 130. Each of these illustrative wells 130 is shown as being completed horizontally. Further, each of these wells is shown as having been completed in substantially the same azimuth. Still further, each of these wells has been perforated along the subsurface formation 130.

The wells first include a pair of producer wells 142. The producer wells 142 have perforations indicated at 152. The wells further include an injection well 144. The injection well 144 is configured to inject a formation-dissolving fluid such as hydrochloric acid into the subsurface formation 130. Still further, the wells include a plurality of guard wells 146. The guard wells 146 are completed on opposing sides of the injection well 144.

The guard wells 146 are configured to inject a pressure-building fluid. Examples of such a fluid include water, brine and carbon-dioxide. Injection of the pressure-building fluid creates pressure boundaries on either side of the injection well 144. As an additional option, the guard wells may use a polymer. The polymer serves as a mobility-limiting fluid. Ideally, the polymer is a crosslinking polymer that links in about ten minutes. In this way, both a pressure boundary and a fluid boundary are provided around the injection well 144. In either event, the creation of pressure boundaries using guard wells is demonstrated more fully in connection with the FIG. 4 series of drawings, discussed below.

FIG. 1B is a cross-sectional view of the subsurface formation 130 from FIG. 1A. The view is taken across line 1B-1B of FIG. 1A. The injection well 144 is shown central to the view. The producer wells 142 are seen on either side of the injection well 144. Further, four guard wells 146 are seen on opposing sides of the injection well 144.

In the view of FIG. 1B, a pressure-building fluid, or guard fluid, is being injected through the guard wells 146 and into the rock matrix making up the subsurface formation 130. The injection of the guard fluid creates a pressure increase (shown schematically through arrows 156).

Of interest in FIGS. 1A and 1B, a formation-dissolving fluid is being injected through the injection well 144 and into the subsurface formation 130. The injection of the formation-dissolving fluid creates one or more wormholes, or a micro-network of wormholes, shown in each view at 154. The wormholes 154 are substantially linear, meaning that they network along a plane in parallel, due to pressure boundaries created by the injection of the pressure-building fluid. Alternatively or in addition, the direction of the network of wormholes 154 is in accordance with a predetermined pressure regime identified in the subsurface formation 130.

It is intended to be shown from FIGS. 1A and 1B that the wormholes 154 extend for many feet. The wormholes 154 may, for example, extend for more than 11 feet, or more than 30 feet, or more preferably even more than 100 feet or up to 150 or 300 feet.

Figure 2B:
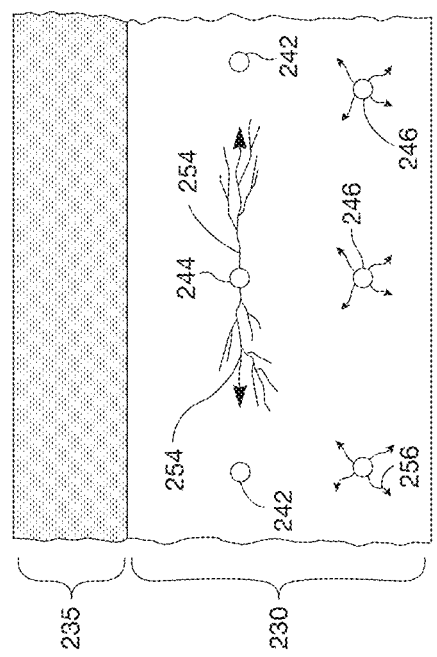
FIG. 2B is a cross-sectional view of the subsurface formation from FIG. 2A, taken across line 2B-2B of FIG. 2A.
Figure 2A:
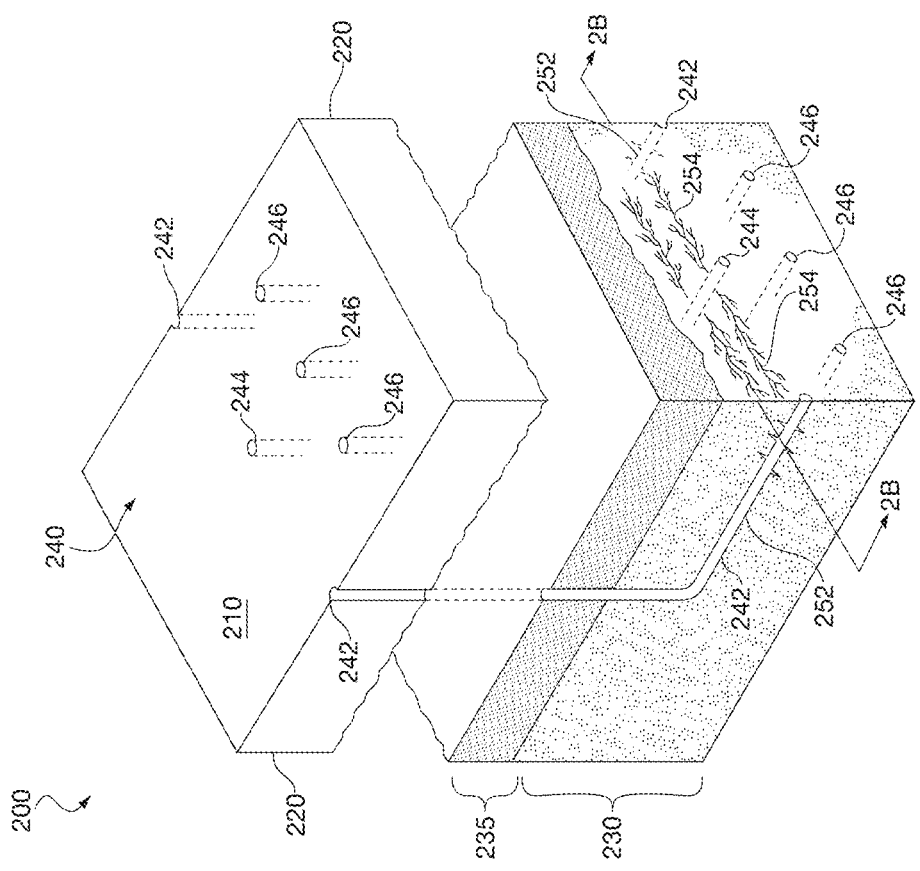
FIG. 2A is another perspective view of a hydrocarbon-producing field. Various wells have again been drilled into a subsurface formation, including producer wells and an injection well. Guard wells have been completed on one side of the injection well, opposite a seal layer, to form pressure boundaries.

FIG. 2A is another perspective view of a hydrocarbon-producing field 200. The field 200 is similar to the field 100 described above. In this respect, the field 200 has a surface 210 and an overburden 220. Below the overburden 220 is a subsurface formation 230. The subsurface formation 230 is again comprised of a rock matrix having a low permeability.

In the field 200, various wells are completed in the subsurface formation 230. The wells first include a pair of producer wells 242 having perforations indicated at 252. The wells further include an injection well 244 is configured to inject a formation-dissolving fluid into the subsurface formation 230. Still further, the wells include a plurality of guard wells 246. In the arrangement of FIG. 2A, the guard wells 246 are completed on only one side of the injection well 244. This is because the subsurface formation 230 includes a zone or streak of particularly low-permeability, or more preferably, impermeable rock 235. The rock layer 235 serves as a pressure seal. Thus, guard wells 246 are not needed above the injection well 244 to generate the linear wormholes 254 in the desired direction.

FIG. 2B is a cross-sectional view of the subsurface formation 230 and the pressure seal layer 235 from FIG. 2A. The injection well 244 is again shown central to the view. The producer wells 242 are seen on either side of the injection well 244. Further, three guard wells 246 are seen on a side of the injection well 144 opposite the pressure seal layer 235.

In the view of FIG. 2B, a pressure-building fluid, or guard fluid, is again being injected through the guard wells 246 and into the rock matrix making up the subsurface formation 230. Arrows 256 indicate a build-up of pressure, or the creation of an engineered pressure gradient within the formation 230.

In addition, a formation-dissolving fluid is being injected through the injection well 244 and into the subsurface formation 230. The injection of the formation-dissolving fluid creates one or more wormholes, shown in each view at 254. The wormholes 254 are substantially linear, or are formed as a network along a plane, due to pressure boundaries created by the injection of the pressure-building fluid and by the presence of the pressure seal layer 235. The wormholes 254 again extend for many feet, such as over 100 feet.

Figure 3:
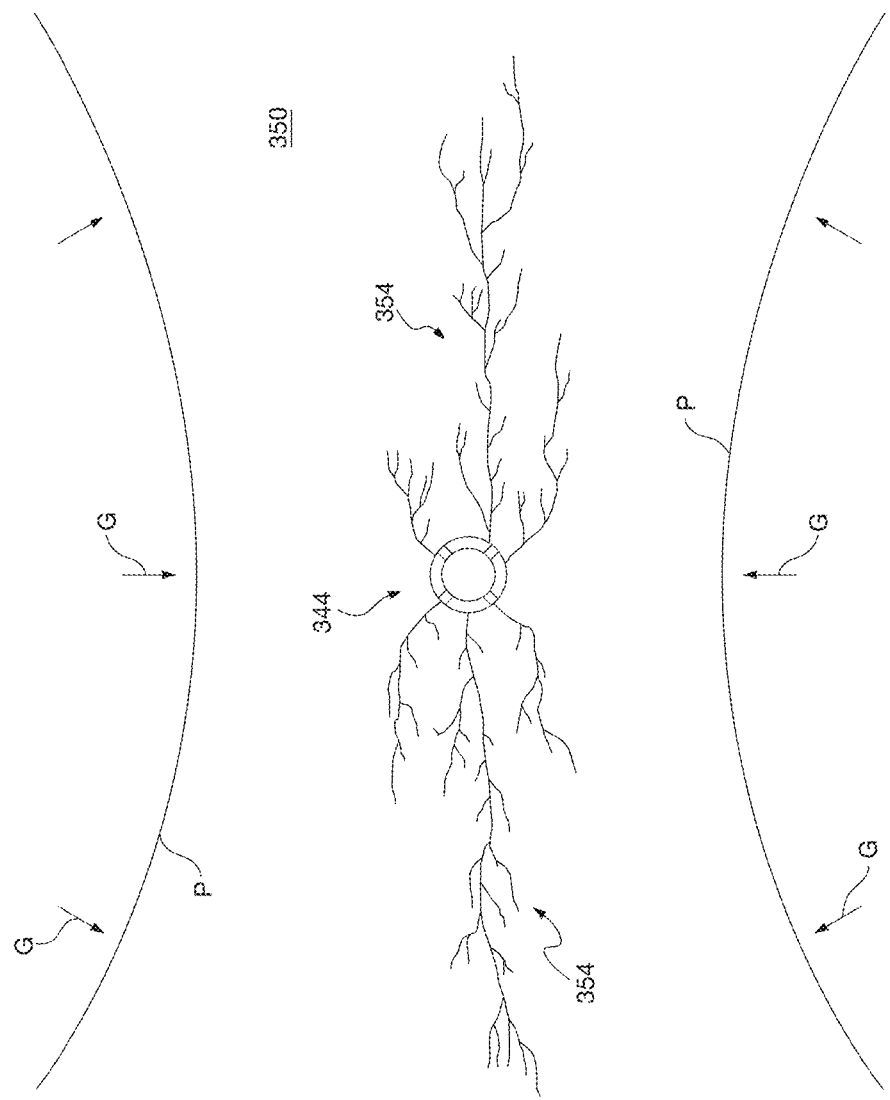
FIG. 3 is an enlarged plan view of an injection well, with pressure boundaries on opposing sides. An extended network of wormholes is seen emanating from the single injection well.

FIG. 3 offers an enlarged plan view of an illustrative injection well 344. The injection well 344 is completed in a rock matrix 350.

In the view of FIG. 3, pressure boundaries P are presented on opposing sides of the injection well 344. The pressure boundaries P are formed by the injection of a pressure-building fluid through guard wells (not shown). Guard wells generate regions of high pore fluid pressure. The flow of the pressure-building fluid is shown by arrows "G."

A result of the movement of the pressure-building fluid G and the creation of the pressure boundaries P is that a network of wormholes 354 is formed in the rock matrix 350. Extended wormholes 354 are seen emanating from the injection well 344. The wormholes 354 extend in substantially a controlled linear direction.

Figure 4B:
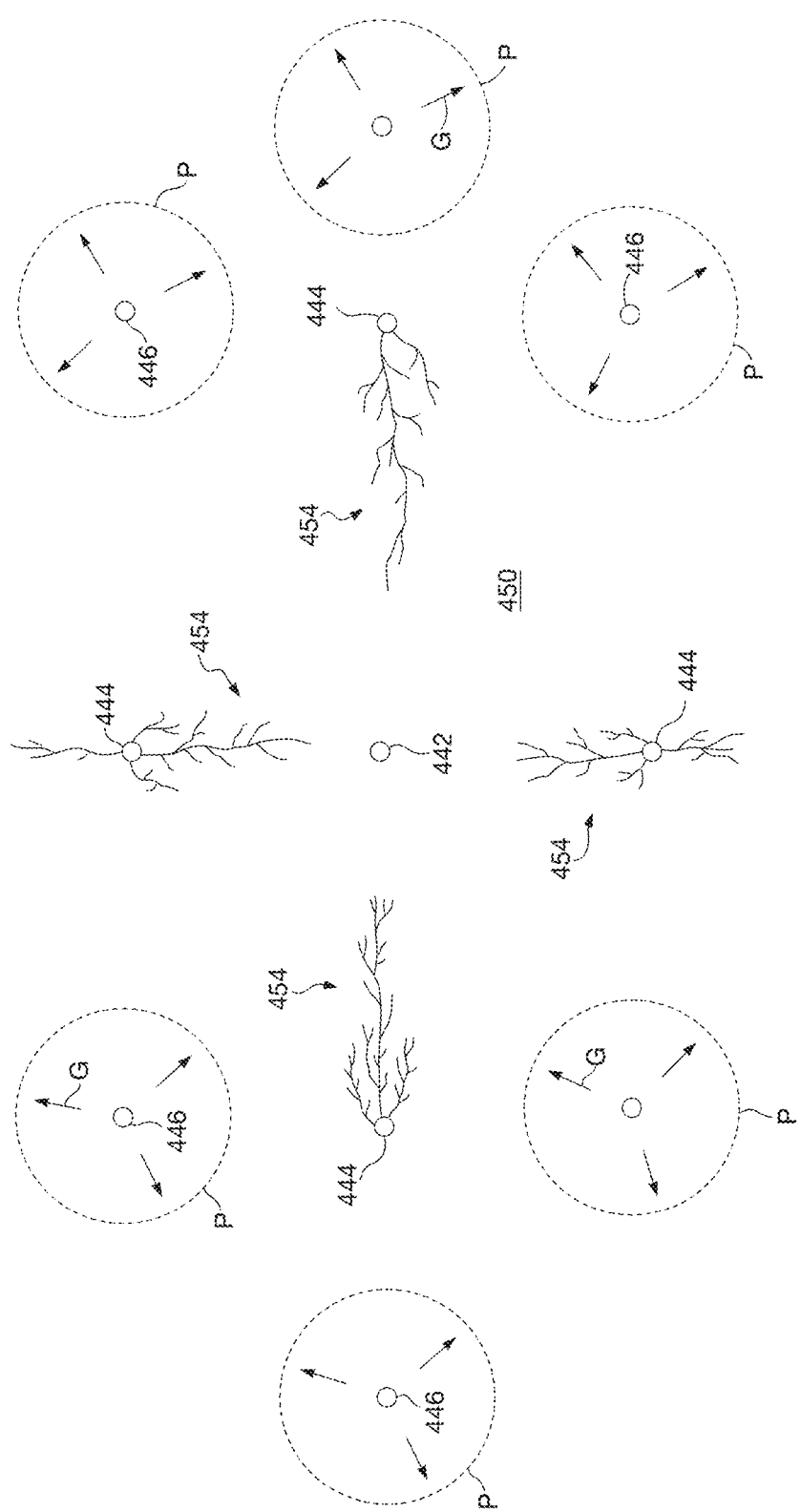
FIG. 4B is another cross-sectional view of the subsurface formation of FIG. 4A. Here, additional injection wells have been added.
Figure 4C:
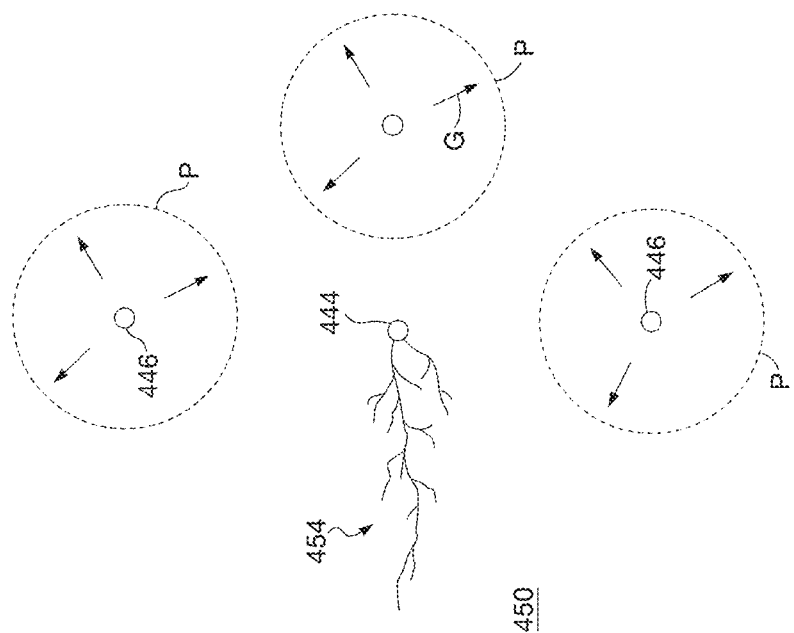
FIG. 4C is a another cross-sectional view of the subsurface formation of FIG. 4A. Here, additional producer wells have been added.

FIGS. 4A, 4B and 4C offer a series of cross-sectional views of a subsurface formation 450. In each view, a producer well 442 is shown central to the formation 450. In addition, a plurality of guard wells 446 are shown located generally radially around the producer well 442. The guard wells 446 are configured to inject a pressure-building fluid. Examples of such a fluid include water, brine and carbon-dioxide. Injection of the pressure-building fluid creates growing pressure boundaries P within the formation 450.

In FIG. 4A, a first pair of injection wells 444 is completed in the subsurface formation 450. An acid is being injected into the formation 450 through the injection wells 444. The acid is injected under sufficient pressure to allow the tips of wormholes 454 to progress through the rock matrix of the formation 450. It is preferred that the acid be placed in an emulsion, such as a dispersion of aqueous HCl suspended in a continuous oil phase. This extends the life of the acid (or, limits diffusivity) during wormhole formation.

Those of ordinary skill in the art will appreciate that for formations that reside below about 1,500 feet, which is almost all economically viable hydrocarbon-producing formations in the world, fractures will tend to propagate vertically. In the illustration of FIG. 4A, it is preferred that fractures propagate linearly in a horizontal direction. Thus, a benefit of the present invention is that wormholes can optionally be formed horizontally by injecting acid at pressures below the fracture pressure. The HCl will actually dissolve carbonate rock, even rock under considerable in situ stresses, without need of "fracking."

As seen in FIG. 4A, wormholes are propagating horizontally towards the producer well 442. Preferably, the wormholes 454 extend for more than 11 feet, or more than 30 feet, or more preferably more than 100 feet, or even up to 150 or 300 feet.

FIG. 4B is another cross-sectional view of the subsurface formation 450 of FIG. 4A, in an alternate completion arrangement. Here, additional injection wells 444 have been added in the subsurface formation 450. The additional injection wells 444 form a line that is transverse to an imaginary line formed by the first opposing pair of injection wells 444.

In FIG. 4B, an acid is being injected into the formation 450 through the second pair of injection wells 444 as well. The acid is injected under sufficient pressure to allow the tips of additional wormholes 454 to progress through the rock matrix of the formation 450. As seen in FIG. 4B, additional wormholes are propagating vertically towards the producer well 442.

It is also observed that the one producer well 442 serves as a pressure sink in the subsurface formation 450. This further drives wormhole formation in the direction of the producer well 442. Further, after a first period of time in which production takes place from the producer well 442, the operator may switch the producer well 442 to serve as an injection well 444. At the same time, one or more of the injection wells 444 may become a producer well 442. This will further enhance the formation of wormholes 454 in the desired direction while optimizing field production.

FIG. 4C is a another cross-sectional view of the subsurface formation 450 of FIG. 4A, in an alternate completion arrangement. The networks of wormholes 454 have again been formed in a linear direction towards the producer well 442. Additional producer wells 442 have been added. The additional producer wells 442 are located along a line that is transverse to an imaginary line formed by the opposing pair of injection wells 444. In the arrangement of FIG. 4C, the new producer wells 442 may have once been injection wells in accordance with the view of FIG. 4B.

Figure 4C:
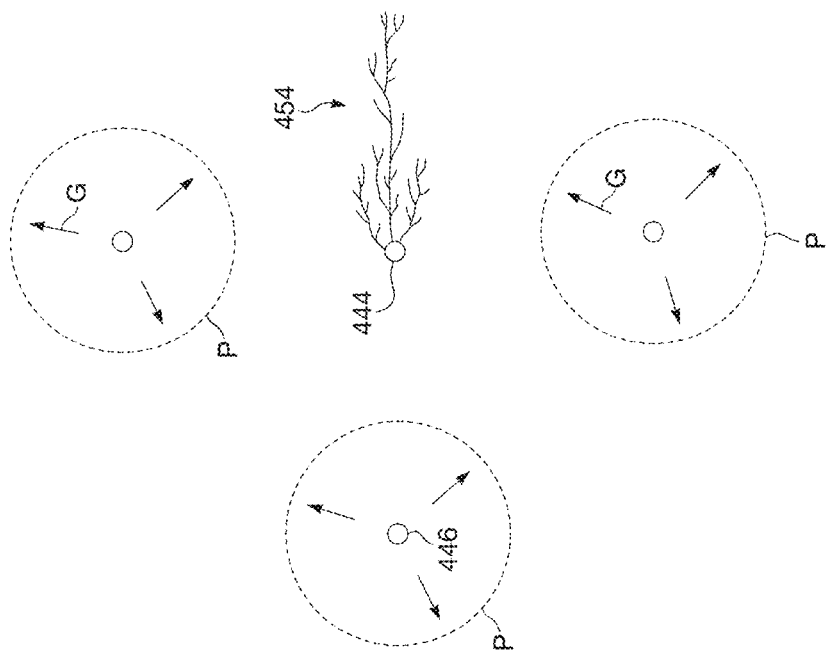

It should be evident from the completion arrangements presented in the FIG. 4 drawing series, as well as FIGS. 1B and 2B, that numerous well configurations may be employed. What is required is that pressure boundaries be created and/or reside within the subsurface formation that allow extended linear wormholes to propagate from injection wells.

Figure 5:
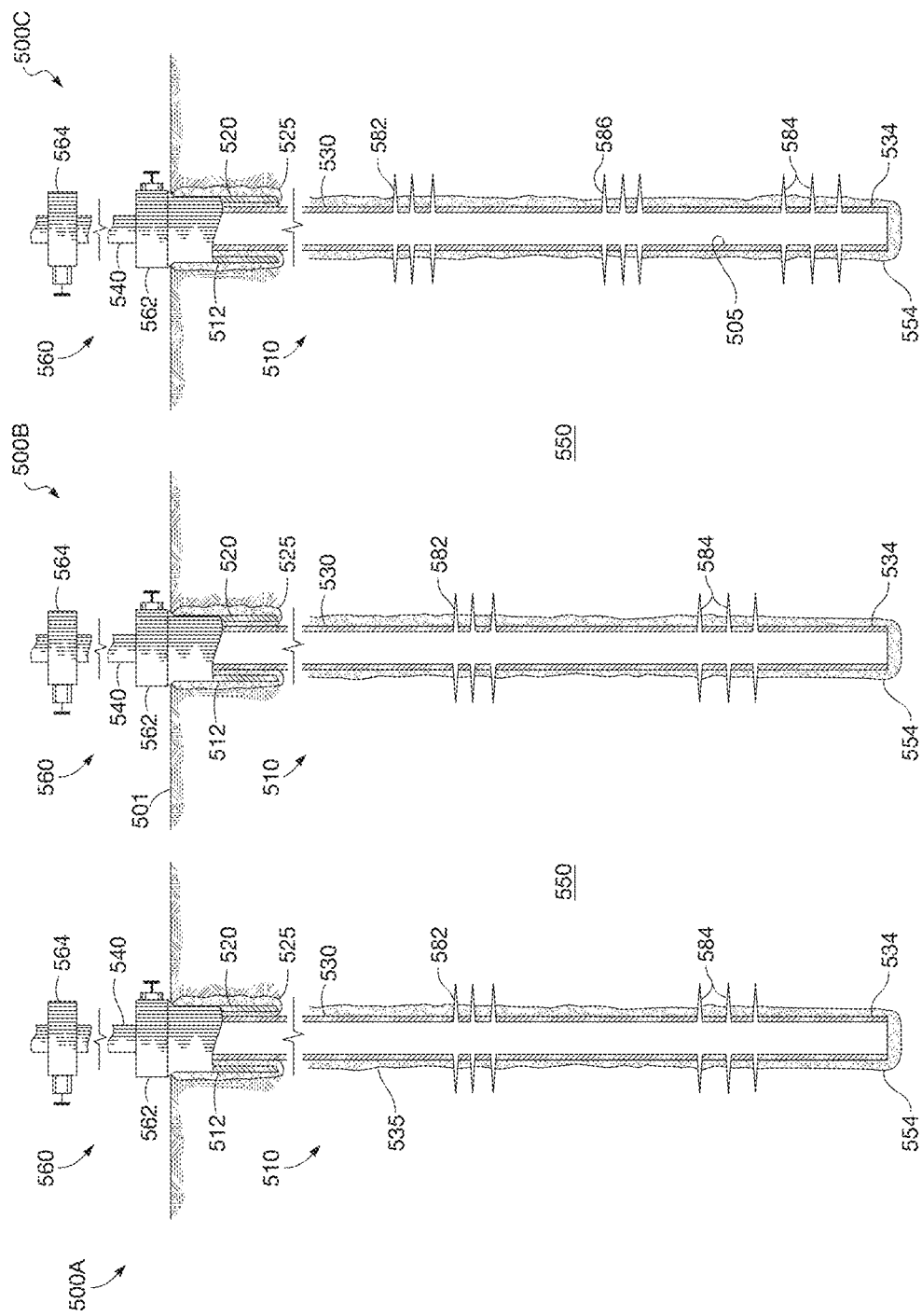
FIG. 5 is cross-sectional side view of several injection wells, shown in side-by-side relation. The wells have been perforated at various subsurface zones.

FIG. 5 is a cross-sectional side view of three injection wells 500. The wells 500 are completed in a subsurface formation 550. The wells 500 are in generally parallel arrangement. The wells 500 are completed for the purpose of injecting a formation-dissolving fluid such as HCl.

Each well 500 defines a wellbore 510 that has been formed into the earth (subsurface formation 550). In FIG. 5, the wells 500 are shown as having been completed vertically. However, it is understood that the wells 500 may be completely horizontally.

Each well 500 includes a well head 560. The well head 560 is positioned at an earth surface 501 to control and direct the flow of injection fluids from the surface 501 and into the subsurface formation 550. The well head 560 may be any arrangement of pipes or valves that injects fluids. In the arrangement of FIG. 5, the well head 560 is a so-called Christmas tree. The illustrative well head 560 includes a top valve 564 and a bottom valve 562. In some contexts, these valves are referred to as "master fracture valves." Of course, other valves may also be provided.

Concerning the wellbores 510 in FIG. 5, each wellbore 510 has been completed with a series of pipe strings referred to as casing. First, a string of surface casing 520 has been cemented into the formation 550. Cement is shown in an annular bore 525 of the wellbore 510. The surface casing 520 has an upper end 512 in sealed connection with the lower master valve 562.

At least one intermediate string of casing (not shown) is typically cemented into the wellbore 510. It is understood that a wellbore may, and typically will, include more than one string of intermediate casing. Some of the intermediate casing strings may be only partially cemented into place, depending on regulatory requirements and the presence of migratory fluids in any adjacent strata. Either an intermediate string of casing or the production liner 530 is in sealed fluid communication with the upper master valve 564.

Additionally, a production liner 530 is provided. The production liner 530 is hung from an intermediate casing string using a liner hanger (not shown). A portion of the production liner 530 may optionally be cemented in place. In the wellbores 510 of wells 500A, 500B, 500C, cement is shown in a bore 535 of the wellbore 510. The combination of the casing 520/530 and the cement sheath in the bores 525, 535 strengthens the wellbore 510 and facilitates the isolation of zones behind the casing 520/530.

The production liner 530 has a lower end 534 that extends to an end 554 of the wellbore 510. For this reason, the wellbore 510 is said to be completed as a cased-hole well.

Those of ordinary skill in the art will understand that for production purposes, the liner 530 may be perforated or may include sections of slotted liner to create fluid communication between a bore 505 of the liner 530 and the surrounding rock matrix making up the subsurface formation 550.

The wellbores 510 of the wells 500A, 500B, 500C may also include a string of tubing (shown only above the surface 501 at 540). The tubing 540 will extend from the well head 560 down to the subsurface formation 550. The tubing 540 will allow for the injection of a formation-dissolving fluid. One or more packers (not shown) may be used to isolate the subsurface formation 550, or zones along the subsurface formation 550. A packer is used to seal off an annular region formed between the tubing 540 and the surrounding production liner 530. It is noted here that the use of an injection tubing 540 and packer is optional. Additionally, the wellbores 510 in general are merely illustrative in their completions; other completion hardware may be employed such as inflatable packers, swell packers, sliding sleeves (or so-called frac sleeves), and the like.

In wells 500A and 500B, the production liner 530 includes perforations 582, 584. These perforations are generally aligned. In the well 500C, the production liner 530 includes perforations 582, 584, and also 586. These perforations are not aligned with the production intervals of the wellbores 510 of wells 500A and 500B. Thus, FIG. 5 is offered to show that acid or other formation-dissolving fluid may be injected along aligned zones and, alternatively, along staggered zones. It is also noted here that while FIG. 5 is intended to show three adjacent injection wells, the wells 500A, 500B, 500C may also represent guard wells used for injecting a pressure-building fluid.

Regardless of the zone of injection, it is important for the operator to select a fluid that is suitable for the formation. Where the formation is comprised primarily of carbonate rock, an acidizing solution is used. Particularly, hydrochloric acid is beneficial for dissolving limestone, dolomite and, beneficially drilling mud particles. In some instances, a hydrocarbon solvent or a metal sequestering agent may be used in addition to or in lieu of acids. Where the formation comprises sandstone, a mixture of hydrofluoric acid (or a hydrofluoric acid precursor) and hydrochloric acid is preferred as the formation-dissolving fluid.

In addition to selecting the formation-dissolving fluid (and its concentration), a flux rate should also be considered. Flux rate is dependent on the rock matrix and the selected acid. In addition to flux rate, well location should also be considered. One technique for determining well placement and for engineering the flow path of the matrix stimulation fluids is though a computational fluid dynamics modeling of the target formation.

A variety of modeling methods and approaches applicable to the subsurface exist. Three such methods are Lattice Boltzmann modeling, finite difference modeling and finite element modeling for porous media.

Lattice Boltzmann modeling simulates the subsurface as a grid of lattice sites. Lattice sites are assigned properties such as permeability, porosity, and concentration of matrix dissolving fluids. As the simulation advances in time, populations of simulation "particles" move from lattice site to lattice site according to the Boltzmann equation:

$$f_i(\vec{x} + \vec{e}_i \delta_i, t + \delta_t) = f_i(\vec{x}, t) + \frac{1}{\tau}(f_i^{eq} - f_i)$$

It has been shown mathematically that the Boltzmann equation expands into the Navier-Stokes equation for fluid flow:

$$\rho\left(\frac{\partial \vec{v}}{\partial t} + \vec{v} \cdot \nabla \vec{v}\right) = -\nabla p + \nabla \cdot \bar{\bar{T}} + \vec{F}$$

wherein velocity & flux are solved together.

By tracking the simulation "particles", it is possible to determine the equivalent fluid velocities (speed and direction) and matrix dissolving fluid fluxes over time at each lattice site. During a given simulation, it is possible to alter the properties of the lattice sites, as well as the matrix-dissolving fluids' concentration. In this manner, it becomes possible to simulate the dissolution behavior of a carbonate matrix being attacked by an acid.

Figure 6A:
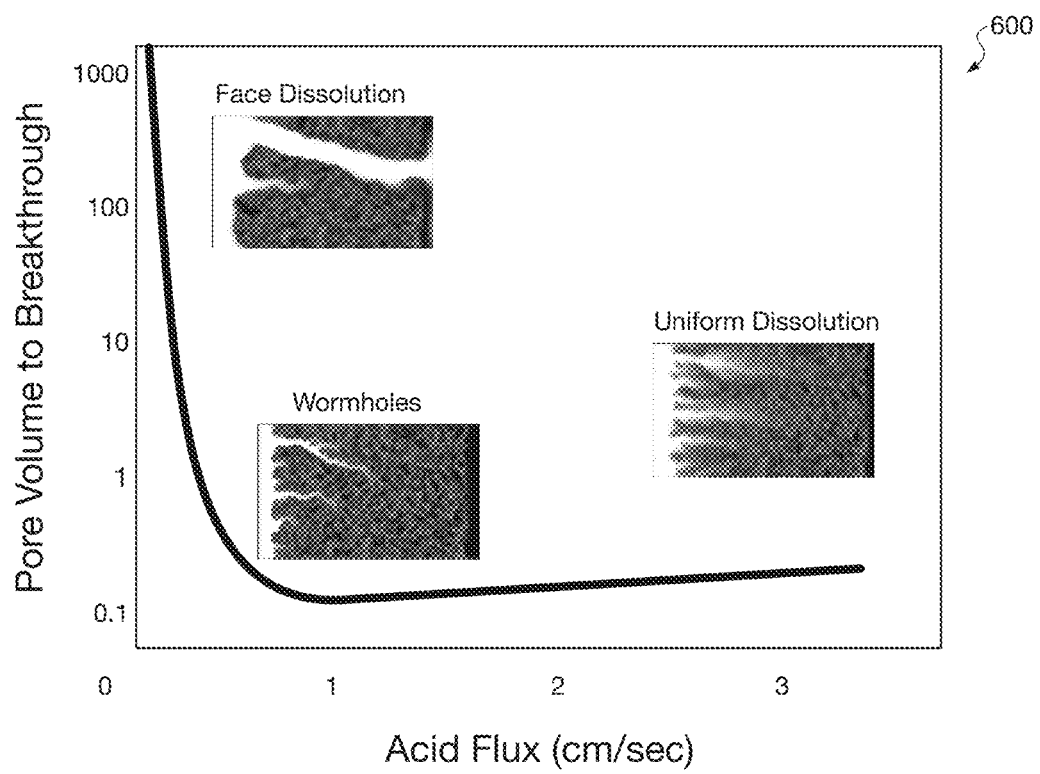
FIG. 6A is a Cartesian coordinate showing Lattice-Boltzmann simulations of porous media flow and acid-generated wormholes.

FIG. 6A is a diagram 600 with a logarithmic chart showing flux rate (along the x-axis in cm/sec) as a function of pore volume to breakthrough (along the y-axis). Acid flux is the volume of acid that flows through a given area in a given amount of time. The curve shown in the diagram is from an empirical expression that is available in the literature, calibrated to data obtained from laboratory experiments on rock samples. Similar results are obtainable using Lattice Boltzmann simulations.

In the diagram 600, the acid dissolution regimes are shown as "Face Dissolution," "Wormholes," and "Uniform Dissolution." The images are from Lattice Boltzmann simulations, and illustrate the different dissolution regimes. The regime or type of acid dissolution that occurs is dependent on the rate of injection.

The diagram 600 shows that at low pore velocities, the acid front (moving from left to right in the images) attacks the face of the rock, exhibiting face dissolution. At moderate pore velocities, the acid is used most efficiently and forms wormholes. At high velocities, the acid penetrates deep into the rock, but fails to form the desired flow channels under the uniform dissolution regime. Note that there is not an abrupt transition from one regime to another.

Figure 6B:
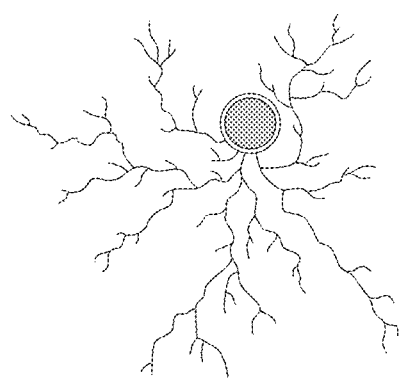
FIG. 6B is a top, cross-sectional view of a wellbore undergoing wormholing. This is a simulation result for a well with a single perforation.

In addition to simulating the conditions needed for wormhole formation, the Lattice Boltzmann method can also predict how manipulation of a reservoir's pressure field will alter the direction of a growing wormhole. FIG. 6B illustrates wormholing simulation results for a well with a single perforation. It is observed that the presence of a single perforation alone fails to prevent the establishment of radial flow from the well such that the wormholes undesirably wrap around the well.

Some have observed that the most efficient process in matrix acidizing is one that will create wormholes with a minimum of branching, and that is characterized by the use of the smallest volume of acid to propagate the wormholes. (See U.S. Pat. No. 7,303,012.) At the same time, industry standard is to use injected acid in connection with hole clean-out, either for skin removal around the wellbore after drilling, or as part of an aggressive fracturing job to enhance the fracture faces, as discussed at length above. However, neither proposal truly increases permeability on the reservoir scale.

The inventors herein propose using the wormhole regime of acid flux for formation dissolution far from the wellbore, and independent of fracturing. This is a novel concept for the oil and gas industry. The inventors herein have designed a process for engineering the flow path of acid during a matrix stimulation to achieve wormholes significantly longer than the traditional "skin removal" processes. Reservoir simulations have been conducted to demonstrate the development of virtual wormholes using Lattice Boltzmann mathematical models.

Figure 7A:
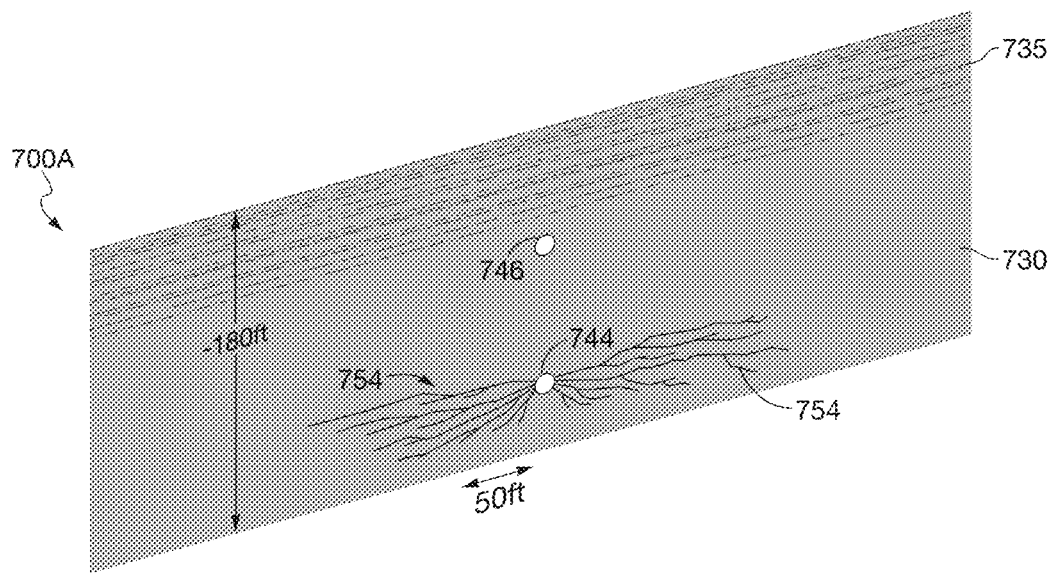
FIG. 7A is a cross-sectional screen shot from a 2D vertical simulation. The simulator modeled the impact of a guard well on wormhole formation from an injection well.

FIG. 7A is a screen shot 700A, from a 2D vertical simulation. The simulation models the impact of a guard well 746 on wormhole formation from an injection well 744. On the macroscopic scale, the Lattice Boltzmann simulation has been considered to explore the impact of a high permeability strata on top of a low permeability formation.

In FIG. 7A, a guard well 746 and an injection well 744 are completed in a zone 730 of low permeability. The zone of low permeability 730 resides below a zone of higher permeability 735. This means that the one or more guard wells 746 resides between the injection well 744 and the area or zone 735 of high permeability. Ideally, the guard well 746 is completed at the interface between high 735 and low 730 permeability zones. This prevents the acid from diverting into the high permeability zone 735. At the same time, the acid injection well 744 is placed in the low permeability carbonate formation 730 so that beneficial wormholes may be created therein.

As evident in FIG. 7A, wormhole growth 754 in the zone of low permeability 730 moves away from the injection well 744. Of interest, the wormholes 754 remain along the low permeability zone 730 and do not migrate upwards towards the high permeability zone 735. Further, migration is generally linear. Creation of the network of wormholes 754 assumes the availability of sufficient volumes of acid for injection at the well site 744, and a sufficiently low diffusivity rate.

Figure 7B:
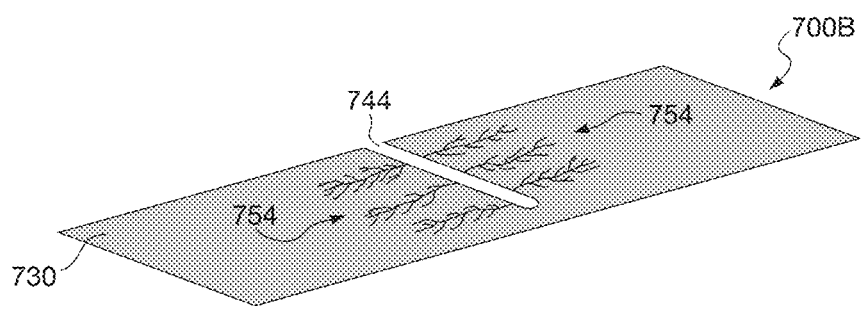
FIG. 7B is a screen shot from the 2D simulator of FIG. 7A. Here, a horizontal or top view of the wormholes and the injection well is seen.

FIG. 7B is a screen shot, or view 700B, from the 2D horizontal simulation of the same idealized reservoir used for the vertical simulation 700A of FIG. 7A. Here, a horizontal view of the wormholes 754 is seen. It can be seen in the simulation view 700B that wormhole propagation and branching takes place essentially linearly, that is, along a plane and generally in a defined direction. It is observed here that the term "linear" does not mean just a single straight line, but includes a network of wormholes that generally extend in a single azimuth.

In the present methods, the guard wells 746 are not employed as part of a traditional enhanced recovery, or "EOR" process. In this respect, the injected fluids are not used to push or "sweep" hydrocarbon fluids towards producer wells. Instead, the guard wells 746 create high pressure boundaries that beneficially direct the propagation of wormholes 754 in a desired direction.

Figure 7C:
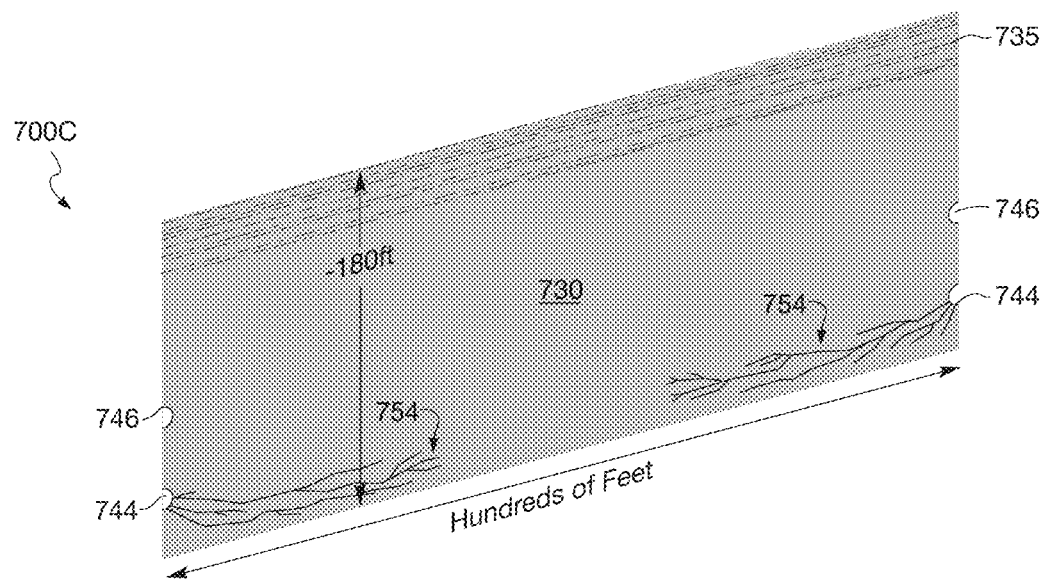
FIG. 7C is a cross-sectional screen shot from another 2D vertical simulation. The simulator modeled the impact of two guard wells, side-by-side, on wormhole formation from a pair of injection wells.

FIG. 7C is a cross-sectional screen shot 700C from another 2D vertical simulation. The simulator modeled the impact of two guard wells 746, side-by-side, on wormhole formation from a pair of injection wells 744.

Figure 7D:
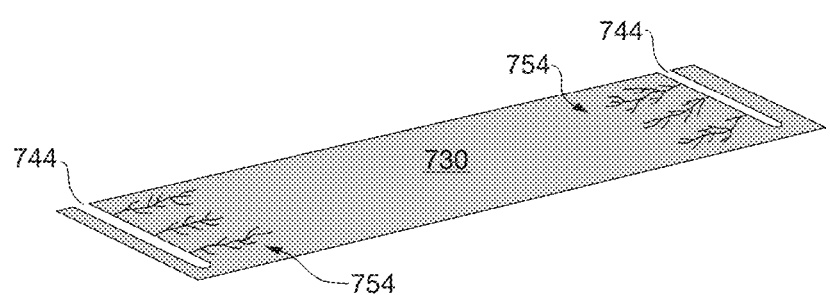
FIG. 7D is a screen shot from the 2D simulator of FIG. 7C. Here, a horizontal or top view of the wormholes and injection wells is seen.

FIG. 7D is a screen shot 700D from the 2D horizontal simulation of the same idealized reservoir used for the vertical simulator 700C of FIG. 7C. Here, a horizontal or top view of the wormholes 754 is seen in a low permeability zone 730. It is here observed that a network of wormholes 754 propagates linearly, as opposed to radially. It is also observed that placing guard wells 746 above the injection wells 744 alters the pressure field and desirably directs the wormhole growth 754 along the low permeability formation. Of interest, the wormholes do not migrate towards the high permeability zone 735.

The simulations of FIGS. 7A through 7D were done using a Lattice Boltzmann fluid flow simulation. Other simulation techniques may be employed, including finite element analysis.

The finite element method provides an approximate numerical solution to complex differential equations which govern the behavior of a reservoir under a given set of conditions. In the finite element analysis for reservoir modeling, a geological system under study is defined by a finite number of individual sub-regions, or "elements." These elements have a predetermined set of boundary conditions. Creating the elements entails gridding or "meshing" the formation. A mesh is a collection of elements that fill a space, with the elements being representative of a system which resides in that space. The process of dividing a production area under study into elements may be referred to as "discretization" or "mesh generation."

Finite element methods also use a system of points called nodes. The nodes are placed on geometric shapes which define the elements. The elements are programmed to contain the material properties which define how the structure will react to certain loading conditions. Nodes are placed at a certain density throughout the material under study. For reservoir modeling, changes to the geological system are predicted as fluid pressures or other reservoir values change.

A range of variables can be used in finite element analysis for modeling a reservoir. For fluid flow modeling, reservoir parameters typically include permeability, pressure, reservoir size and, perhaps, temperature. For geomechanical modeling such parameters may include various rock properties such as Poisson's ratio, the modulus of elasticity, shear modulus, Lame constants, or combinations thereof. Recently, coupled physics simulators have been developed which seek to combine the effects of both fluid flow parameters and geomechanics to generate reservoir responses.

Figure 8:
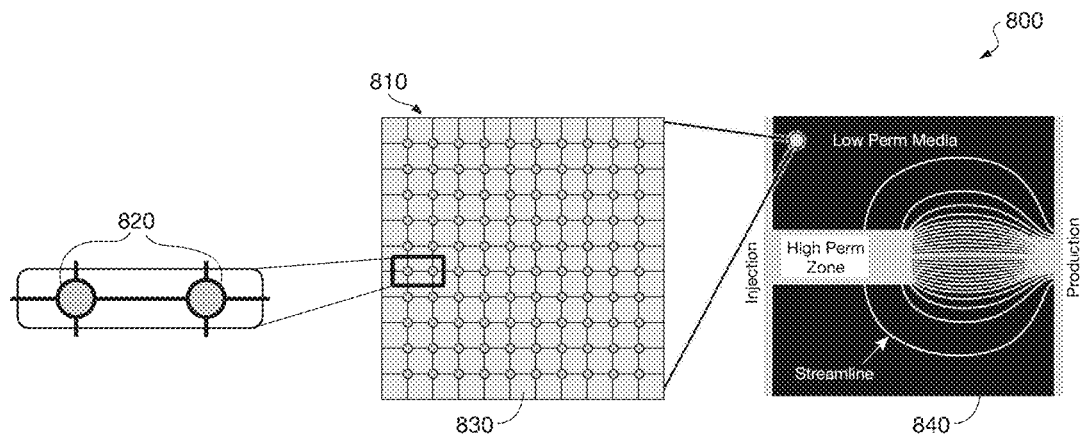
FIG. 8 demonstrates a pore network simulation as may be used in modeling wormhole formation in accordance with methods of the present invention, in one embodiment.

FIG. 8 demonstrates a pore network simulation 800 as may be used in both modeling wormhole formation, and engineering pressure gradients to guide and extend wormhole growth. In FIG. 8, an illustrative pore network is shown at 810. The pore network 810 connects nodes 820, with each node 820 being associated with a pressure value. Between each node 820 is a pore 830.

The pore network simulation 800, or model, implements Darcy's equation across pores connecting the pressure nodes 820. Darcy's equation may generally be presented as follows:

$$Q = \frac{kA}{\mu}\left(\frac{\Delta P}{L}\right)$$

where

Q=fluid flow rate, or flux k=formation permeability (Darcy's)

A=cross-sectional area (feet)

$\Delta P$=reservoir pressure differential (psid)

$\mu$=viscosity (cp)

L=length of fluid flow (feet)

In FIG. 8, two nodes 820 are indicated at i and j. Darcy's equation may be described in this instance as:

$$Q = \frac{kA}{\mu}\left(\frac{P_j - P_i}{L}\right)$$

In the context of gas flow, Darcy's equation may be written as follows:

$$Q_g = \frac{703kh(P_e^2 - P_w^2)^n}{\mu zT\ln(r_e/r_w')}$$

where
$Q_g$=gas production rate (MCFPD)
k=formation permeability (Darcy's)
h=average formation thickness (feet)
$P_e$=reservoir pressure at the drainage radius (psia)
$P_w$=bottom-hole flowing pressure (psia)
n=deliverability coefficient (dimensionless)
μ=viscosity (cp)
z=gas compressibility factor (dimensionless)
T=temperature (° R=° F.+460)
$r_e$=external (i.e., "drainage") radius (feet)
$r_w'$=the effective parent wellbore radius, as computed from the van Everdingen skin factor ("S") equation, In the simulation of FIG. 8, pressure is tracked at each node 820 while flowrate is tracked at each pore 830. Each pore is assigned its own permeability, which can be varied during the simulation to produce a growth of wormholes.

The pores and nodes are linked together to form a large array. After pressure and flowrate boundary conditions are defined in a pore network (or finite element) model, the simulation is iterated until the pressure and flowrate fields converge. The pore network model converges faster than the Lattice Boltzmann method, making it ideal for studying how streamlines in core and reservoir scale porous media are influenced by the placement of pressure sources (guard wells), pressure sinks (production wells), high permeability zones (wormholes), and low permeability regions (diverting agents).

Field 840 of FIG. 8 demonstrates the flow of fluid from an injection source to a production source using a large array of pores and nodes. It is observed that if the flow of the injected fluid is confined to a horizontal plane, that is, through the use of guard wells above and below the horizontal injection well, radial flow only occurred at the periphery of the simulation region. Otherwise, flow was principally linear. Linear flow, favorable to long wormhole growth, is demonstrated to occur along much of the length of the simulated region 840. This desirable linear flow is not expected to occur in the absence of guard wells or other pressure boundaries restricting the acid injection to a linear plane.

While linear flow is a necessary condition for long wormhole growth, it is not sufficient. Generation of long wormholes (greater than 10 feet) is only possible if a significant portion of the injected acid is able to reach the wormhole tip. If an ordinary acid (e.g., HCl dissolved in water) is used for wormhole growth and the wormhole is long enough, a substantial portion of the acid may be carried to the wormhole wall by turbulent mixing, convection due to leak-off, and/or diffusion. Acid reacts with the walls and does not reach the wormhole tip. However, turbulent mixing may be avoided by considering the Reynolds numbers for flow in a wormhole at typical acid stimulation injection rates. Engineering calculations indicated that the flow in the wormhole under typical field stimulation conditions was within the laminar range. Leak-off was investigated using pore-network simulations, and this effect was also determined to be negligible under linear flow conditions.

Figure 9:
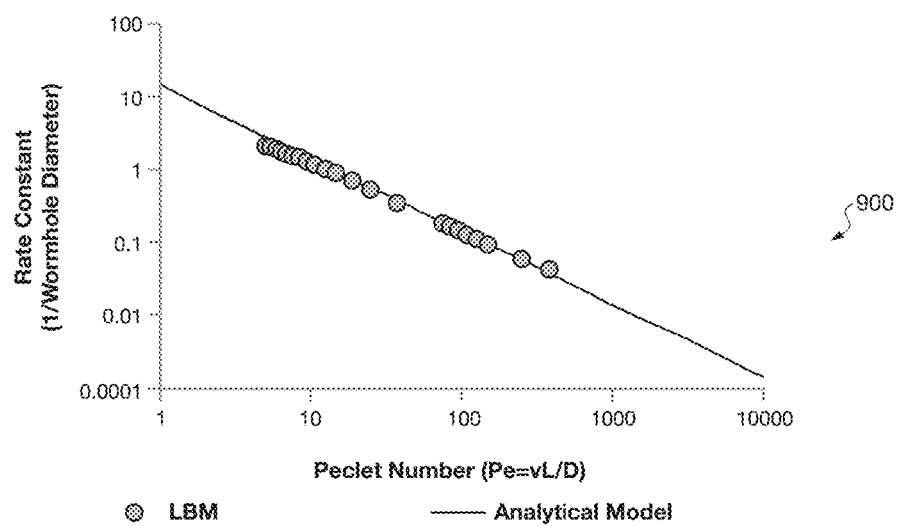
FIG. 9 is a Cartesian coordinate demonstrating a correlation between the Lattice-Boltzmann simulation and the analytical equation for acid consumption during wormhole formation.

An analytical model for the bulk acid concentration inside a growing wormhole (Ca) as a function of initial injected acid concentration ($Ca_0$), acid diffusivity (D), distance traveled along the wormhole (z), and acid volumetric flowrate (Q) was derived from first principles:

$$Ca = Ca_0 \cdot \exp\left(\frac{-3.657 \cdot \pi \cdot D \cdot z}{Q}\right)$$

where
Ca=acid concentration at the tip of a growing wormhole
$Ca_0$=initial injected acid concentration
D=acid diffusivity
z=distance traveled along the wormhole; and
Q=acid volumetric flowrate This analytical model was validated against 3D Lattice Boltzmann simulation results of acid flowing through a pore. FIG. 9 is a Cartesian coordinate 900 demonstrating a correlation between the Lattice-Boltzmann simulation ("LBM") and the analytical equation for acid consumption during wormhole formation. Using reported values for the diffusivity of HCl dissolved in water ($5.25 \times 10^{-5}$ cm$^2$/s), it was determined that the acid would be almost completely exhausted (only 1% remaining) after traveling only 76 feet down a wormhole due to reactions with the wormhole wall. In fact, 50% of the acid will be consumed at the wall after only 11 feet, and 90% will be consumed by 38 feet.

Different acids yield similar results, as the diffusivities (D) do not vary significantly. Any acid consumed before reaching the tip of the wormhole cannot contribute to the wormhole's linear growth.

It is again noted that these values are for linear flow conditions. Under radial flow conditions as practiced in the prior art, the maximum wormhole length is much less.

It is therefore desirable to control the diffusivity (D) of the acid. One practice to control the acid's diffusivity is to emulsify it. By confining the aqueous acid to emulsified droplets in a continuous oil phase, the droplets—rather than the molecular acid—must diffuse to the wormhole walls. Due to the much greater size of the droplets compared to the acid molecules (several orders of magnitude difference), the droplets have a much lower diffusivity.

The D value of an emulsified acid can be calculated by the Stokes-Einstein equation using the Boltzmann constant ($k_B$):

$$D = \frac{k_B T}{6\pi\mu r}$$

where
D=diffusivity
$k_B$=Boltzmann constant
T=absolute temperature
m=solute fluid viscosity; and
r=emulsion droplet radius It is observed above that aqueous HCl with a diffusivity of $5.25 \times 10^{-5}$ cm$^2$/sec will be almost completely exhausted (1% remaining) after traveling only 76 feet (23.1 meters) down a wormhole. Therefore, it is preferred that an acid emulsion be used. Emulsified aqueous HCl droplets 1μ in diameter will, in theory, travel distances that are three orders of magnitude greater than non-emulsified acids. Combined with linear flow, the engineering calculations indicate that wormholes with lengths in excess of 100's of feet are possible. This assumes that sufficient acid is available at the well site for injection into the well. Such long wormholes will beneficially enable stimulation of formations on the reservoir scale.

It is also noted that the software-based model need not be a 3D model. In one aspect, the model is a 2D model. In another aspect, the model is a 4D model wherein time is the fourth dimension. A 4D model is merely a type of 3D model that is comprised of a series of 3D models at different points of time. Any of these models are considered to be a multi-dimensional model.

After establishing the feasibility of generating long wormholes by the Lattice-Boltzmann method and pore network models; the effectiveness of long wormholes were quantified by using conventional reservoir simulation flow models. It was found that introduction of such wormholes can significantly accelerate field production and markedly increase recoveries by improving sweep efficiencies. Further, it was found that selective injection of mobility control substances from guard wells can further increase recoveries.

Figure 10A:
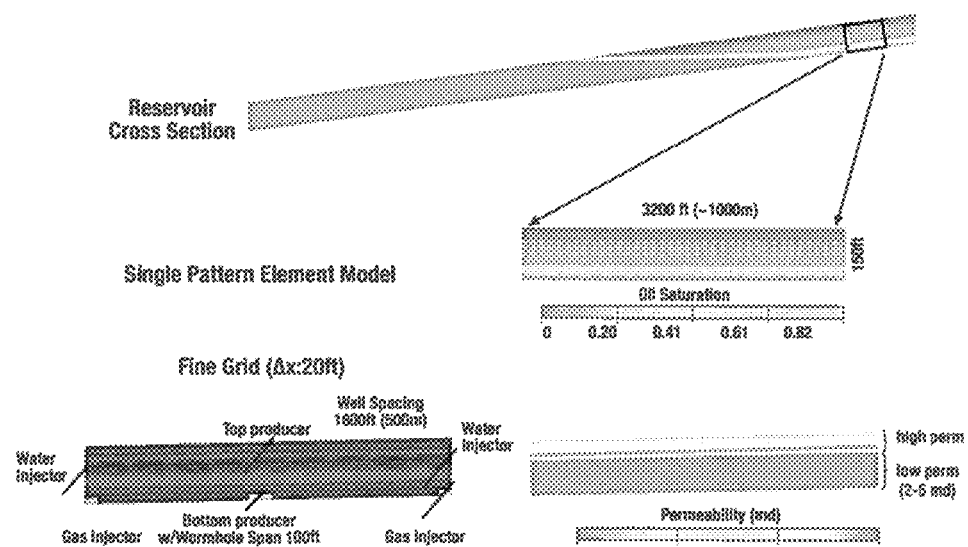
FIG. 10A is an example of a reservoir simulation flow model demonstrating the impact of extended wormholes.
Figure 10B:
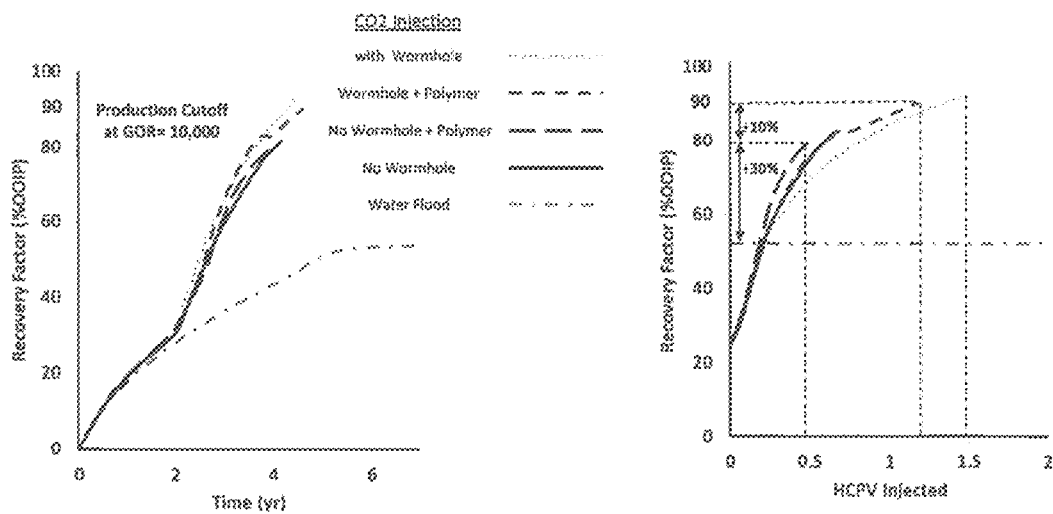
FIG. 10B presents a pair of Cartesian coordinates showing reservoir simulation results from the flow model of FIG. 10A.

FIGS. 10A and 10B illustrate the reservoir simulation model set-up and results for a conservative wormhole generation length assumption (50 feet), placed at the base of a high permeability contract reservoir as in the scenario of FIG. 7A. Also evaluated were cases with longer wormholes, that expectedly indicated even more favorable performance.

FIG. 10A is an example of a reservoir simulation flow model demonstrating the impact of an extended wormhole. FIG. 10B presents a pair of Cartesian coordinates showing reservoir simulation results from the flow model of FIG. 10A. Production rate and recovery volumes are increased through the use of wormholes. The injection of a polymer or other mobility control agent in guard wells further increases profitability of the production wells.

Based on the graphs and figures, it can be seen that a method for forming extended wormholes in a subsurface formation is provided. Strategic placement of the wells allows for engineering of fluid flow paths through the reservoir. Stated another way, the method controls the flow of injected and produced fluids by the creation of pressure gradients. Because the flow path of the injected fluids is determined by the pressure field local to the flowing fluid, manipulation of this pressure field will alter the injected/produced fluids' paths. Appropriate placement of the guard wells and/or production wells ensures linear flow of acid from the injection wells. Further, controlling the flow path of an injected fluid allows for the generation of exceptionally long wormholes during acid stimulation of carbonate reservoirs.

Figure 11:
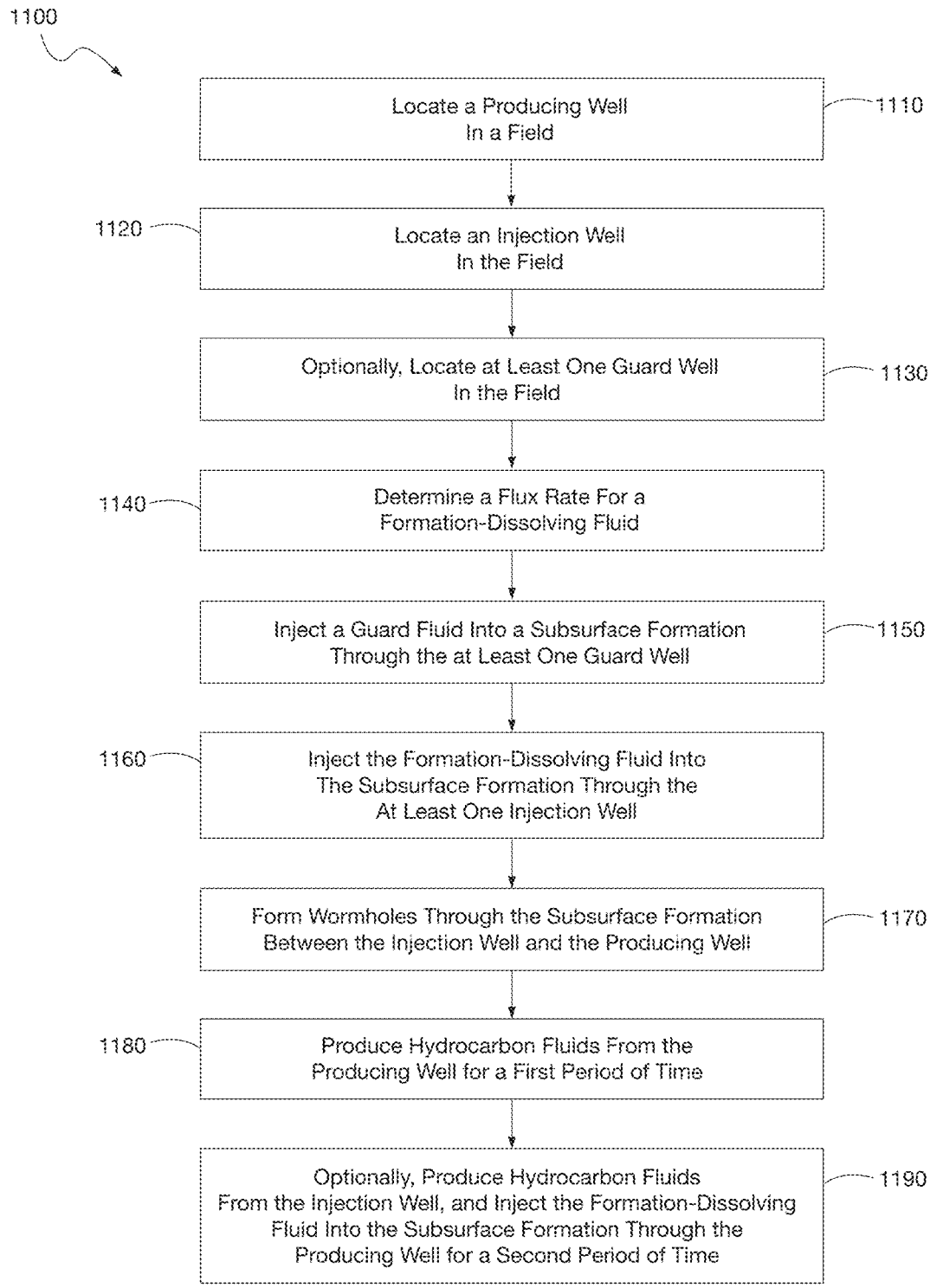
FIG. 11 is a flow chart showing steps for a method of forming extended wormholes in a subsurface formation.

FIG. 11 is a flow chart showing steps for a method 1100 of forming extended wormholes in a subsurface formation, in one embodiment.

In one aspect, the method 1100 first comprises locating a producer well in a field. This is seen at Box 1110. The producer well is completed in the subsurface formation. It is understood that more than one producer well may actually be completed in the subsurface formation.

The method 1100 also includes locating a first injection well in the field. This is provided at Box 1120. The injection well is generally placed adjacent or proximate to the producer well.

The method also optionally includes locating at least one guard well in the field. This is shown at Box 1130. The guard well is preferably placed adjacent the injection well.

The first injection well and the at least one guard well are all completed in the subsurface formation. In one aspect, the production well, the first injection well and the guard well are each completed horizontally and in the same general azimuth. In another aspect, each of the wells is completed vertically.

The method 1100 also includes determining a flux rate for a formation-dissolving fluid. This is indicated at Box 1140. The flux rate is dependent upon different variables including the composition of the rock matrix making up the subsurface formation and the type of acid or other formation-dissolving fluid selected. In one illustrative embodiment, the formation comprises primarily a carbonate rock matrix and the formation-dissolving fluid is an acid. An example of an acid is an emulsion containing hydrochloric acid. In another illustrative embodiment, the formation comprises primarily a sandstone rock matrix and the formation-dissolving fluid is a hydrofluoric acid or a hydrofluoric acid precursor, which may be combined or mixed with hydrochloric acid.

Preferably, the step of determining a flux rate for the formation-dissolving fluid is done by using computational fluid dynamics. This is based on a lithology of the rock matrix and experimental data.

The method 1100 may further include the step of simulating the reservoir. The step of simulating the reservoir may include (i) determining a temperature of the subsurface formation, (ii) determining a permeability of the subsurface formation, (iii) determining a porosity of the subsurface formation, (iv) determining in situ pressures within the subsurface formation, (v) determining a lithology of the subsurface formation, or (vi) combinations thereof.

The reservoir simulation step involves numerical methods, or mathematical models. In one aspect, simulating the reservoir further comprises determining a spatial relationship between the producer well, the first injection well, and at least one guard well. In one aspect, a result of the step of simulating the reservoir is confirming a direction of the propagation of wormholes substantially and linearly toward the producer well. In another aspect, a step of simulating the reservoir is determining a length of propagation of a wormhole network towards a producer well.

The method 1100 also includes injecting a guard fluid into the subsurface formation. This is provided at Box 1150. The guard fluid is injected through the at least one guard well. This serves to form a pressure boundary within the subsurface formation. The pressure boundary may be formed by using guard wells that are placed on opposing sides of the injection well. Alternatively, the pressure boundary may be formed by placing the guard well on a side of the injection well that is opposite a low-permeability layer, or seal. Alternatively, the pressure boundary may be formed by placing the guard well between an injection well and an area of high permeability, thereby keeping wormhole formation along a zone of low permeability.

The method 1100 further includes injecting the formation-dissolving fluid into the subsurface formation. This is seen at Box 1160. The formation-dissolving fluid is injected through the first injection well at a rate to reach the determined flux rate. In one embodiment, the method 100 also includes changing the temperature of the formation-dissolving fluid. This serves to adjust the flux rate.

The method 1100 also comprises forming wormholes through the subsurface formation. This is shown at Box 1170. The wormholes are formed substantially along a plane defined between the injection well and the at least one producer well. Preferably, the wormholes extend for a length of at least 11 feet. More preferably, the wormholes extend for a length of greater than 150 feet, or even greater than 300 feet, in a controlled direction.

The method 1100 additionally comprises producing hydrocarbon fluids from the producing well. This is indicated at Box 1180. Production takes place for a first period of time.

In one embodiment, production operations are suspended after the first period of time. Production is then commenced from the injection well for a second period of time. During this second period of time, acid or other formation-dissolving fluid may be injected into the producer well. In other words, injection and production roles of the respective wellbores are cycled. The regular cycling of the wells between acid injection and production roles stimulates hydrocarbon recovery by further extending wormhole lengths.

In any of the above embodiments, the method 1100 may also include monitoring the production of hydrocarbon fluids from the producer well.

As can be seen, novel processes for engineering extended wormholes in a "tight" subsurface formation are provided. The processes herein are not limited to any well orientation or any well architecture or any specific completion equipment. Such matters are within the discretion of the reservoir engineer, being driven by the reservoir characteristics and determinable by one skilled in the art based on the present disclosure. A well may inject/produce/guard along its entire length, a portion of its length, or along separate lengths or points. The injection/production/guard segments of a given well may be aligned or staggered with those of its neighboring wells, as noted in connection with FIG. 5, depending on the characteristics of the reservoir.

In order to depict a progression of extending wormhole lengths from short radial distances (in accordance with the prior art) to hundreds of feet (in accordance with aspects of the present disclosure), FIGS. 12A through 12D are provided.

Figure 12A:
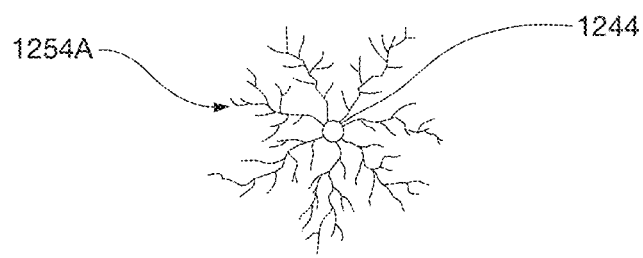
FIGS. 12A through 12D show a progression of extending wormhole lengths form short radial distances to hundreds of feet.

FIG. 12A is a cross-sectional view of a single injection well 1244. This is a classic acid injector well, creating a radial network of wormholes 1254A during a matrix stimulation job. Matrix stimulation fluids injected from the well 1244 flow across the local pressure gradient. If the permeability is locally uniform, matrix stimulation fluids injected into the formation will flow radially away from the injection well 1244 in the absence of additional pressure gradient control. However, outward flow of the acid is very limited, producing wormholes that typically are no more than a few feet in length absent the application of pressure well in excess of the formation parting pressure.

Figure 12B:
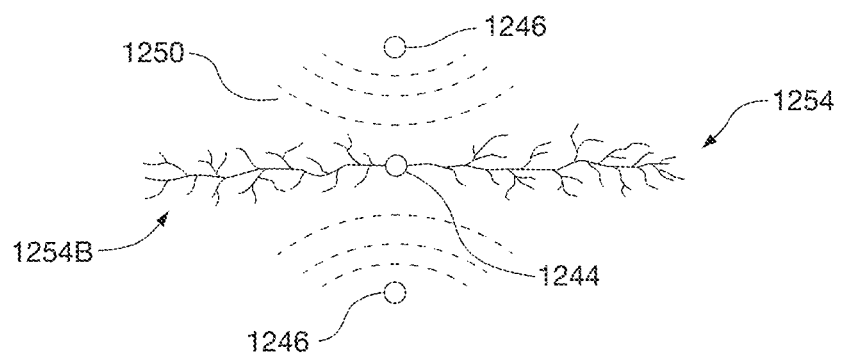

FIG. 12B illustrates an injection well 1244 in the presence of two guard wells 1246. In this novel arrangement, the guard wells 1246 introduce high pressure boundaries to manipulate the pressure gradient around the injection well 1244. By creating ridges of high pressure, the guard wells 1246 generate a pressure gradient to guide the injected matrix stimulation fluids along an engineered path. In this example, the path is designed to prevent radial flow of the matrix stimulation fluids away from the injection well 1244. Instead, a substantially linear network of wormholes 1254B is formed.

Figure 12C:
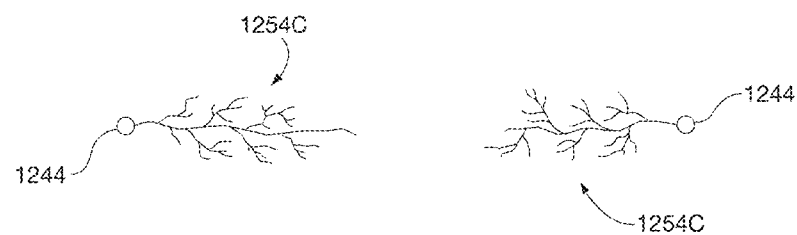

FIG. 12C illustrates the use of a pair of wells 1244 that cycle between injection and production. At any given time, one well will operate as a producer and the other as an injector. Elongated networks of wormholes 1254C are formed by the well in production mode creating a pressure sink and drawing towards it the matrix stimulation fluid from the well in injection mode. FIG. 12C demonstrates that wormhole lengths in excess of 50 feet are possible if acid diffusion is controlled and linear flow is enforced across the wells 1244.

Figure 12D:
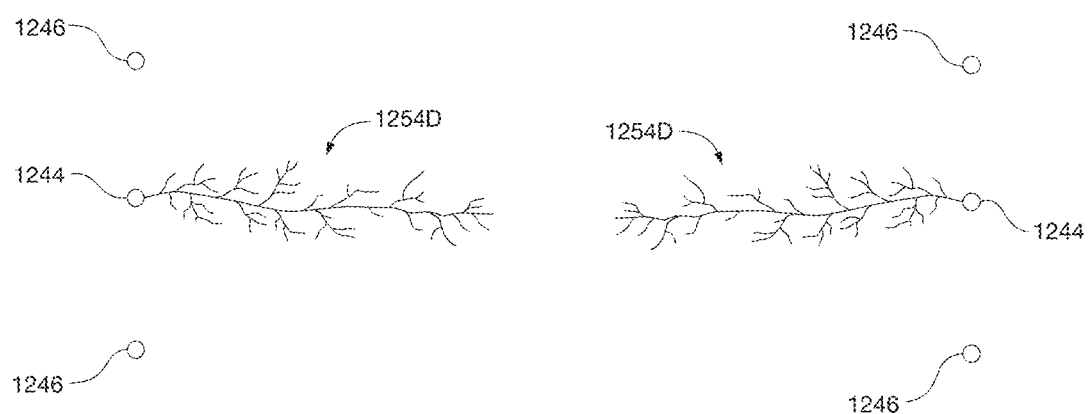

FIG. 12D shows a pair of injection wells 1244 along with pairs of guard wells 1246. Guard wells 1246 are placed on opposing sides of two wells 1244. As with FIG. 12C, the wells alternate roles as the producer and injector. The inclusion of guard wells 1246 further enhances the linear flow of the matrix stimulation fluid between the producer/injector wells through the formation of interest. In FIG. 12D, the networks of wormholes 1254D are intended to be in excess of 50 feet.

In view of the progression shown in FIGS. 12A through 12D, another method for forming extended wormholes in a subsurface formation is also provided herein. The alternative method does not necessarily rely upon the formation of an artificial pressure gradient through the injection of a guard fluid; instead, the method involves a determination of the pressure regime in the subsurface formation, and using that pressure regime in connection with the injection of a formation-dissolving fluid.

In accordance with this approach, the method first includes determining a lithology of a rock matrix in the subsurface formation. In addition, the method includes determining a pressure regime in the subsurface formation.

The method next includes completing a first wellbore in a substantially horizontal orientation in the subsurface formation. Thereafter, the method comprises injecting the formation-dissolving fluid into the subsurface formation through the first wellbore. The injection takes place at a flux rate designed to create wormholes through the rock matrix.

The method also includes continuing to inject the formation-dissolving fluid so as to form wormholes that extend at least 11 feet from the first wellbore, and substantially along a plane defined between the wellbore and an area of lower pressure within the subsurface formation created by a producer well. More preferably, the wormholes extend a length that is greater than 50 feet, and more preferably greater than 150 feet.

The method also includes discontinuing the injection of the formation-dissolving fluid into the subsurface formation after a first period of time, and then producing hydrocarbon fluids from the first wellbore for a second period of time. This reversing of wellbore operations may be duplicated again and again.

It is understood that this method does not preclude the use of at least one guard well. Thus, in one aspect the method further comprises completing a second wellbore in a substantially horizontal orientation in the subsurface formation proximate to the first wellbore, and injecting a guard fluid into the subsurface formation through the second wellbore before or during the first time period. This serves to create an area of higher formation pressure on a first side of the first wellbore. A third wellbore may optionally be completed adjacent to the first wellbore but opposite from the second wellbore for the injection of guard fluids.

It is also understood that this method does not preclude the completion of separate producer wells. Thus, in one aspect the method further comprises completing a fourth wellbore in a substantially horizontal orientation in the subsurface formation adjacent to the first wellbore, and producing hydrocarbon fluids from the fourth wellbore after the first period of time. Thus, the adjacent wells are cycled between injector and producer functions.

The above process offers benefits beyond the known "skin removal" technique. In the traditional "skin removal" process, wormhole length is limited because acid injected into a subterranean formation will flow radially away from its source and quickly lose the velocity needed to maintain wormhole growth. Even if a single port in a cased well is used for injection, the injected acid will wrap around the casing and establish radial flow. By using guard wells as a pressure source, along with using producer wells as pressure sinks, and by selecting an acid having a suitable flux rate, an extended linear flow path of the injected acid is beneficially enabled. The velocity needed to maintain wormhole growth is preserved deep into the formation, allowing for wormhole growth significantly beyond the near wellbore region.

Some work has explored altering flow paths within a formation on the reservoir scale (see WO 2009148723 and WO 2010087898), but these approaches create additional channels and flow paths through mechanical drilling. It is also observed that, unlike the so-called acid fracturing procedures proposed in the prior art, the present process of creating extended wormholes does not rely upon the formation of fractures, nor does it require injection pressures in excess of the parting pressure of the in situ rock matrix. This is not to say that a fracturing process could not be utilized in the formation, but that would preferably be from the nearby producer well, not the injection well.

What is claimed is:

1. A method of forming extended wormholes in a subsurface formation, comprising:
   locating at least one guard well in a field, the at least one guard well being completed in the subsurface formation;
   injecting a guard fluid into the subsurface formation through the at least one guard well, thereby forming a pressure boundary;
   locating a first injection well in the field proximate the at least one guard well, the injection well also being completed in the subsurface formation;
   determining a flux rate for a formation-dissolving fluid in a rock matrix of the subsurface formation;
   injecting the formation-dissolving fluid into the subsurface formation through the first injection well at a rate to reach the determined flux rate, but wherein the formation-dissolving fluid is injected at a pressure that is below a formation parting pressure in the subsurface formation; and
   using the formation-dissolving fluid, forming wormholes through the subsurface formation substantially along a plane from the injection well that does not intersect the pressure boundary.

2. The method of claim 1, further comprising:
   determining a pressure regime in the subsurface formation; and
   locating the first injection well such that wormhole formation comprises a network of wormholes formed in a substantially linear direction along the plane.

3. The method of claim 1, further comprising:
   locating a producer well in the field, the producer well also being completed in the subsurface formation proximate the first injection well; and
   producing hydrocarbon fluids from the producer well for a first period of time;
   wherein the at least one guard well creates an area of higher pressure within the subsurface formation while the producer well creates an area of lower pressure within the subsurface formation, thereby inducing wormhole formation in a substantially linear direction along the plane and towards the producer well.

4. The method of claim 3, wherein the producer well, the first injection well and the at least one guard well are each completed horizontally and along a same general azimuth with respect to each other.

5. The method of claim 3, wherein:
   the subsurface formation comprises primarily a carbonate rock matrix; and
   the formation-dissolving fluid is an acid.

6. The method of claim 5, wherein the acid comprises a hydrochloric acid emulsion.

7. The method of claim 3, wherein:
   the subsurface formation comprises primarily a sandstone rock matrix; and
   the formation-dissolving fluid is an emulsion comprising hydrofluoric acid, a hydrofluoric acid precursor, or combinations thereof.

8. The method of claim 3, further comprising:
   discontinuing producing hydrocarbon fluids from the producer well and discontinuing injecting the formation-dissolving fluid from the first injection well at the end of the first period of time; and
   producing hydrocarbon fluids from the first injection well and injecting the formation-dissolving fluid into the subsurface formation through the producer well simultaneously for a second period of time.

9. The method of claim 8, further comprising:
   continuing to inject the guard fluid through the at least one guard well while producing hydrocarbon fluids from the first injection well.

10. The method of claim 8, further comprising:
    locating a second injection well in the field, the second injection well also being completed in the subsurface formation along a plane proximate the producer well; and
    injecting the formation-dissolving fluid into the subsurface formation through the second injection well also at a rate to reach the determined flux rate.

11. The method of claim 10, wherein:
    each of the first injection well and the second injection well is completed for the injection of the formation-dissolving fluid into more than one zone in the subsurface formation; and
    the first injection well is configured to inject into fewer zones than the second injection well.

12. The method of claim 11, wherein separate planes are formed in parallel relation between the zones.

13. The method of claim 3, further comprising:
    monitoring fluid production from the producer well during the first period of time.

14. The method of claim 3, wherein:
    the step of locating at least one guard well in the field comprises placing a first guard well on one side of the injection well and placing a second guard well on a side of the injection well opposite the first guard well, to form a pair of guard wells; and
    a pressure boundary is formed on either side of the injection well such that a direction of a plane formed between the injection well and the producer well is substantially transverse to a plane formed in the subsurface formation by the pair of guard wells.

15. The method of claim 14, further comprising:
    adjusting a location of the pair of guard wells in order to change a planar orientation of propagation of wormholes in the rock matrix.

16. The method of claim 3, wherein:
    the subsurface formation comprises an impermeable layer;

the producer well is located in an area of lower relative formation permeability; and a direction of a plane formed between the injection well and at least one producer well is substantially along the area of lower relative formation permeability.

17. The method of claim 16, wherein:

the production well, the first injection well and the at least one guard well are each completed horizontally and along a same general azimuth with respect to each other; and the step of locating at least one guard well in the field comprises either placing a guard well on a side of the injection well opposite the impermeable layer, or placing a guard well between the injection well and the impermeable layer.

18. The method of claim 3, further comprising:

injecting a mobility control agent into the at least one guard well to further control a direction of wormhole growth within the subsurface formation.

19. The method of claim 1, wherein the wormholes define a network of wormholes that extends substantially along the plane for a length of at least 11 feet.

20. The method of claim 19, wherein the wormholes define a network of wormholes that extends substantially along the plane for a length of at least 100 feet.

21. The method claim 1, wherein the first injection well is perforated along at least three zones.

22. The method of claim 1, further comprising:

determining a type of the formation-dissolving fluid to inject through the first injection well; and determining a volume of the formation-dissolving fluid to be injected.

23. The method of claim 22, wherein:

the step of determining a flux rate for the formation-dissolving fluid is part of a step of simulating a reservoir with a software-based reservoir simulation model; and the step of simulating the reservoir further comprises (i) determining a temperature of the subsurface formation, (ii) determining a permeability of the subsurface formation, (iii) determining a porosity of the subsurface formation, (iv) determining in situ pressures within the subsurface formation, (v) determining a lithology of the subsurface formation, or (vi) combinations thereof for the reservoir simulation model.

24. The method of claim 23, wherein:

the step of determining a flux rate uses computational fluid dynamics; and a result of the step of simulating the reservoir is confirming a direction of propagation of wormholes substantially toward a producing well.

25. The method of claim 23, wherein the step of simulating the reservoir further comprises conducting geomechanical modeling as part of simulating the reservoir.

26. The method of claim 23, wherein the step of simulating the reservoir further comprises inputting into the reservoir simulation model a spatial relation between a producer well, the first injection well, and the at least one guard well.

27. The method of claim 22, further comprising:

changing the temperature of the formation-dissolving fluid before injecting the formation-dissolving fluid.

28. A method of forming extended wormholes in a subsurface formation, comprising:

locating a producer well in a field, the producer well being completed in the subsurface formation;

locating an injection well in the field, the injection well also being completed in the subsurface formation;

determining a flux rate for a formation-dissolving fluid in a rock matrix of the subsurface formation based upon computational fluid dynamics modeling;

injecting the formation-dissolving fluid into the subsurface formation through the injection well at a rate to reach the determined flux rate, but wherein the formation-dissolving fluid is injected at a pressure that is below a formation parting pressure in the subsurface formation; and using the formation-dissolving fluid, forming wormholes through the subsurface formation extending between the injection well and the producer well at a distance greater than eleven feet.

29. The method of claim 28, further comprising:

locating at least one guard well in the field, the at least one guard well also being completed in the subsurface formation;

injecting a guard fluid into the subsurface formation through the at least one guard well, thereby forming a pressure boundary; and producing hydrocarbon fluids from a producer well.

30. A method for creating extended wormholes in a subsurface formation, comprising:

determining a lithology of a rock matrix in the subsurface formation;

determining a pressure regime in the subsurface formation;

completing a first wellbore in a substantially horizontal orientation in the subsurface formation;

injecting a formation-dissolving fluid into the subsurface formation through the first wellbore at a pressure that is below a formation parting pressure of the subsurface formation, wherein the injection is at a flux rate designed to create wormholes through the rock matrix;

producing hydrocarbon fluids from a fourth wellbore that is proximate to the first wellbore, thereby creating a pressure sink;

continuing to inject the formation-dissolving fluid so as to form wormholes that extend greater than ten feet from the first wellbore, and substantially along a plane defined between the first wellbore and the pressure sink within the subsurface formation as a first cycle discontinuing the injection of the formation-dissolving fluid into the subsurface formation and the production of hydrocarbon fluids from the fourth wellbore; and producing hydrocarbon fluids from the first wellbore and injecting the formation-dissolving fluid through the fourth wellbore as a second cycle, wherein the second cycle increases the wormholes along the plane.

31. The method of claim 30, further comprising:

completing a second wellbore in a substantially horizontal orientation in the subsurface formation proximate to the first wellbore;

injecting a guard fluid into the subsurface formation through the second wellbore before or during the first cycle, thereby creating an area of higher formation pressure on a first side of the first wellbore.

32. The method of claim 31, further comprising:

completing a third wellbore in a substantially horizontal orientation in the subsurface formation adjacent to the first wellbore, but opposite from the second wellbore;

injecting the guard fluid into the subsurface formation through the third wellbore before or during the first cycle, thereby creating an area of higher formation pressure on a second opposite side of the first wellbore.

33. The method of claim 32, further comprising:
discontinuing injecting the guard fluid through the second and third wellbores before the second cycle.

34. The method of claim 30, further comprising:
discontinuing the production of the hydrocarbon fluids from the first wellbore and the injection of the formation-dissolving fluid into the subsurface formation through the fourth wellbore; and
again producing hydrocarbon fluids from the fourth wellbore and again injecting the formation-dissolving fluid into the first wellbore as a third cycle, wherein the third cycle further increases the wormholes along the plane.

35. The method of claim 34, further comprising:
completing a fifth wellbore in a substantially horizontal orientation in the subsurface formation adjacent to the first wellbore;
injecting a guard fluid into the subsurface formation through the fifth wellbore during the second cycle, thereby creating an area of higher formation pressure on a first side of the first wellbore.

36. The method of claim 35, further comprising:
completing a sixth wellbore in a substantially horizontal orientation in the subsurface formation adjacent to the first wellbore, but opposite from the second wellbore;
injecting the guard fluid into the subsurface formation through the sixth wellbore during the second cycle, thereby creating an area of higher formation pressure on a second opposite side of the first wellbore.

37. The method of claim 36, further comprising:
discontinuing injecting the guard fluid through the fifth and sixth wellbores before the third cycle.

* * * * *